(12) United States Patent
Siband et al.

(10) Patent No.: US 11,104,808 B2
(45) Date of Patent: Aug. 31, 2021

(54) ENERGY CURABLE AQUEOUS COMPOSITIONS

(71) Applicant: ALLNEX Belgium S.A., Drogenbos (BE)

(72) Inventors: Elodie Siband, Brussels (BE); Stephan Peeters, Heverlee (BE)

(73) Assignee: ALLNEX BELGIUM S.A., Drogenbos (BE)

( * ) Notice: Subject to any disclaimer, the term of this patent is extended or adjusted under 35 U.S.C. 154(b) by 129 days.

(21) Appl. No.: 16/337,490

(22) PCT Filed: Oct. 18, 2017

(86) PCT No.: PCT/EP2017/076551
§ 371 (c)(1),
(2) Date: Mar. 28, 2019

(87) PCT Pub. No.: WO2018/077682
PCT Pub. Date: May 3, 2018

(65) Prior Publication Data
US 2019/0233560 A1 Aug. 1, 2019

(30) Foreign Application Priority Data
Oct. 26, 2016 (EP) .................................. 16195756

(51) Int. Cl.
| | | |
|---|---|---|
| C09D 4/06 | (2006.01) | |
| C08F 220/06 | (2006.01) | |
| C08F 8/44 | (2006.01) | |
| C09D 175/14 | (2006.01) | |
| C08F 2/46 | (2006.01) | |
| C08F 220/64 | (2006.01) | |
| C08L 33/02 | (2006.01) | |
| C08L 75/04 | (2006.01) | |
| C08F 222/10 | (2006.01) | |

(52) U.S. Cl.
CPC ................. *C09D 4/06* (2013.01); *C08F 2/46* (2013.01); *C08F 8/44* (2013.01); *C08F 220/06* (2013.01); *C08F 220/64* (2013.01); *C08L 33/02* (2013.01); *C08L 75/04* (2013.01); *C09D 175/14* (2013.01); *C08F 222/1065* (2020.02); *C08F 2500/02* (2013.01); *C08L 2312/00* (2013.01)

(58) Field of Classification Search
CPC .. C08F 220/06; C08F 222/1065; C08L 33/02; C08L 75/04; C09D 4/06; C09D 175/14
See application file for complete search history.

(56) References Cited

U.S. PATENT DOCUMENTS

| | | | |
|---|---|---|---|
| 2009/0143528 A1* | 6/2009 | Mestach | ............... C08F 265/02 524/832 |
| 2012/0328795 A1 | 12/2012 | Peeters et al. | |
| 2014/0377466 A1 | 12/2014 | Tielemans | |

FOREIGN PATENT DOCUMENTS

| | | |
|---|---|---|
| EP | 1 869 097 | 12/2007 |
| EP | 2 365 036 | 9/2011 |
| EP | 2 639 272 | 9/2013 |
| WO | 2006/110784 | 10/2006 |
| WO | 2009/007296 | 1/2009 |

OTHER PUBLICATIONS

International Search Report dated Nov. 30, 2017 in International Application No. PCT/EP2017/076551.
Written Opinion of the International Searching Authority dated Nov. 30, 2017 in International Application No. PCT/EP2017/076551.

\* cited by examiner

*Primary Examiner* — Ling Siu Choi
*Assistant Examiner* — David L Miller
(74) *Attorney, Agent, or Firm* — Wenderoth, Lind & Ponack, L.L.P.

(57) ABSTRACT

The present invention relates to an energy curable aqueous composition (X) comprising (a) Water; (b) At least a water-insoluble ethylenically unsaturated compound (A); (c) At least one (meth)acrylic polymer (B1) containing ionic functional groups that are at least partly neutralized by a neutralizing agent (C) and/or at least one (meth)acrylic hybrid (B2) containing ionic functional groups that are at least partly neutralized by a neutralizing agent (C); and (d) At least one nonionic emulsifier (D) comprising alternating polyalkylene oxide segments, said nonionic emulsifier (D) having an HLB value of at least 4.5. Materials of the invention are suitable for the preparation of inks, overprint varnishes or coating compositions.

20 Claims, No Drawings

ENERGY CURABLE AQUEOUS COMPOSITIONS

The present invention relates to new energy curable aqueous compositions comprising ethylenically unsaturated compounds and external emulsifiers, to their preparation and uses.

The energy curable aqueous compositions according to the present invention are suitable for the formulation of inks as well as protective and decorative (clear or pigmented) coatings on various substrates.

Energy curable coating and ink compositions are usually composed of ethylenically unsaturated compounds and in particular of ethylenically unsaturated monomers, oligomers and polymers. The function of the monomers is to lower the viscosity of the composition. However, some monomers typically remain unreacted in the coating or ink after curing. This causes unpleasant odors and tastes as well as environmental and health hazards. As an alternative to the presence of monomers, organic solvent may be used to reduce the viscosity. However, organic solvents suffer from the same ailments as monomers.

Low viscous water-based systems have been introduced in the market, which do not suffer from the above disadvantages. They can be dispersions, solutions or emulsions. There is a need for suitable emulsifier systems to stabilize aqueous compositions that contain energy curable compounds that need an external emulsifier to obtain a stable composition. It is often difficult to control the pH of such compositions and/or particle sizes may be too big.

EP1869097B1 discloses an energy curable aqueous composition comprising water, an ethylenically unsaturated oligomer, and a resin not containing energy curable functional groups, wherein the resin contains neutralized acidic and/or basic functional groups. This composition allegedly exhibits an improved solvent resistance when compared to similar compositions where the resin contained energy curable functional groups. Viscosity, particle size, film aspect, and stability were not evaluated.

WO 2009/007296 (Cytec) relates to maleinated acrylated oils. Example 18 relates to an acrylated maleated linseed oil. The compound obtained is a 100% UV compound, not a water based compound. The compounds disclosed in this document do not contain neutralized acidic and/or basic functional groups in an amount that would render the compound dispersible or emulsifiable in water.

EP2639272 (Cytec) relates to aqueous radiation curable emulsions that comprise water-insoluble radiation curable compounds and a specific non-ionic external emulsifier.

It is hence an object of the present invention to bring new energy curable aqueous compositions (X) that overcome some or all of the above drawbacks.

Therefore, the present invention relates to an energy curable aqueous composition (X) comprising:
Water;
At least one water-insoluble ethylenically unsaturated compound (A);
At least one (meth)acrylic polymer (B1) containing ionic functional groups that are at least partly neutralized by a neutralizing agent (C) and/or at least one (meth) acrylic hybrid (B2) containing ionic functional groups that are at least partly neutralized by a neutralizing agent (C); and
At least one nonionic emulsifier (D) comprising alternating polyalkylene oxide segments, said nonionic emulsifier (D) having an HLB value of at least 4.5.

Compounds (B1) and (B2) are further referred to as compounds (B). In one embodiment of the invention compounds (B) are (meth)acrylic polymers (B1). In another embodiment of the invention compounds (B) are (meth) acrylic hybrids (B2). In yet another embodiment of the invention a mix of both compounds (B1) and (B2) is used.

The present invention further relates to a method for preparing an energy curable aqueous composition (X) according to any embodiment of the present invention.

The present invention further relates to a process for preparing a coated substrate or article, comprising the step of coating at least part of the substrate or article with an aqueous composition (X) as defined in any embodiment of the present invention.

The energy curable aqueous composition (X) of the invention typically has a solid content of from 30 to 70 wt %, preferably from 40 to 65 wt % and more preferably from 45 to 65 wt %.

As used herein and unless provided otherwise, the term "energy curable", when applied to the aqueous composition (X) of the invention, means that the composition can be cured by electrons or by actinic radiations. Preferred are hence radiation curable aqueous compositions (X). Typically, curing is performed under UV radiation in the presence of a photoinitiator. The UV source can be any UV source known to the person skilled in the art, including LED UV sources and/or HUV curing sources.

The compositions (X) of the present invention can also be cured thermally in the presence of a radical source and an initiator.

Most typically emulsions (X) are obtained, and then in particular oil-in-water emulsions. By "emulsion" is meant a two-phase system in which one phase is dispersed in another (the continuous phase) as droplets of microscopic or colloidal size with the help of mixing. By an "oil-in-water emulsion" is meant to designate in the present invention an emulsion whose dispersed phase is a water-insoluble organic phase and whose continuous phase is water. By an "oil-in-water emulsion" is meant to designate in the present invention an emulsion whose dispersed phase is a water-insoluble organic phase, present as droplets, and whose dispersing phase is water.

Compounds (A) of the invention can be any type of water-insoluble ethylenically unsaturated compounds known in the art.

By "a water-insoluble compound" is meant to designate in the present invention a compound that is not self-dispersible, not self-emulsifiable, but that forms a dispersion or an emulsion in water in the presence of one or more external emulsifiers. More in particular compounds (A) are compounds that are not self-dispersible, not self-emulsifiable, and not water-dilutable. By a "self-dispersible compound" is meant to designate in the present invention a compound that, when mixed with water, forms a stable two-phase system of small particles dispersed in water without the aid of an additional emulsifier. By a "self-emulsifiable compound" is meant to designate in the present invention a compound that, when mixed with water, forms a stable two-phase system of small droplets dispersed in water without the aid of an additional emulsifier. By "stable" is meant to designate herein that there is substantially no coalescence (droplets) nor flocculation (particles) leading to phase separation, creaming or sedimentation of the heterogeneous system after 1 day, preferably not even after 2 or more days, typically 4 or more days, most preferably not even after 10 days at 60° C. By a "water-dilutable compound" is meant to designate in the present invention a compound that permits to form a homogeneous, single phase mixture when the compound is mixed with water over a broad concentration range such as for instance from 5 to 75 wt % of water in the total mass of water and the compound, and this in the absence of external emulsifiers.

By an "ethylenically unsaturated compound" is meant in the present invention a compound having at least one ethylenically unsaturated group which can undergo radical polymerization. By "ethylenically unsaturated groups" is meant to designate in the present invention groups with one or more carbon-carbon double bonds which under the influence of irradiation and/or a (photo)initiator can undergo radical polymerization. The polymerizable ethylenically unsaturated groups are generally chosen from allyl groups, vinyl groups and/or from (meth)acryloyl groups, though double bonds may come also from unsaturated acids, unsaturated fatty acids, acrylamides etc. Preferred are often "(meth)acrylated compounds", meaning compounds having one or more (meth)acryoyl groups. In the present invention, the term "(meth)acryl" is to be understood as to encompass both acryl and methacryl compounds or derivatives as well as mixtures thereof. Acrylic groups are generally preferred.

Typically compounds (A) of the invention do not comprise any pendant hydrophilic groups (like carboxylic acid, sulfonic or phosphonic acid groups, or the corresponding salt) nor any alkylene oxide segments in an amount that would render the compound self-dispersible, self-emulsifiable or water-dilutable.

Typically, compounds (A) are oligomers, polymers or a combination thereof. As used herein, the term oligomer refers to a compound having a Mn of from 250 to 1000 g/mol while the term polymer refers to a compound having a Mn of 1000 g/mol or more as measured by gel permeation chromatography using polystyrene standards.

Compounds (A) are ethylenically unsaturated compounds and are typically (meth)acrylated compounds, most typically acrylated compounds.

Preferably, compounds (A) are selected from one or more of: ethylenically unsaturated urethanes (A1), ethylenically unsaturated polyesters (A2), ethylenically unsaturated (poly)epoxys (A3), ethylenically unsaturated polycarbonates (A4), ethylenically unsaturated polyethers (A5), and ethylenically unsaturated poly(meth)acrylics (A6). Preferred are ethylenically unsaturated urethanes (A1), ethylenically unsaturated polyesters (A2) and/or ethylenically unsaturated poly(meth)acrylics (A6). Most preferred are ethylenically unsaturated urethanes (A1) and/or ethylenically unsaturated polyesters (A2). Preferred ethylenically unsaturated polyesters are ethylenically unsaturated alkyds.

Most typically, compounds (A) are (meth)acrylated compounds. Hence, more preferably, compounds (A) are selected from one or more of: urethane (meth)acrylates (A1), polyester (meth)acrylates (A2), (poly)epoxy (meth)acrylates (A3), polycarbonate (meth)acrylates (A4), polyether (meth)acrylates (A5), and poly(meth)acrylic (meth)acrylates (A6). More preferably, compounds (A) of the invention are selected from one or more of: urethane (meth)acrylates (A1), polyester (meth)acrylates (A2) and/or poly(meth)acrylic (meth)acrylates (A6). Most preferably, compounds (A) of the invention are selected from urethane (meth)acrylates and/or from polyester (meth)acrylates (A2). Preferred polyester (meth)acrylates (A2) are alkyd (meth)acrylates.

Urethane (meth)acrylates (A1) typically are obtained from the reaction of at least one polyisocyanate (i), at least one polymerizable ethylenically unsaturated compound (ii) containing at least one reactive group capable to react with isocyanate groups, and optionally at least one other compound (iii) that contains at least one reactive group capable to react with isocyanate groups. By "other" is meant that compounds (iii) are different from compounds (ii). The "reactive groups capable to react with isocyanate groups" can be hydroxyl groups, amino groups and/or thiol groups. Most typically however they are hydroxyl groups.

By a polyisocyanate (i) is meant to designate a compound containing at least two isocyanate groups. Typically, the polyisocyanate contains not more than six isocyanate groups, more preferably not more than three isocyanate groups. Most typically it is a diisocyanate. The polyisocyanate is generally selected from aliphatic, cycloaliphatic, aromatic and/or heterocyclic polyisocyanates, or combinations thereof.

Examples of aliphatic and cycloaliphatic polyisocyanates that may be used are: 1,6-diisocyanatohexane (HDI), 1,1'-methylene bis[4-isocyanatocyclohexane] (H12MDI), 5-isocyanato-1-isocyanatomethyl-1,3,3-trimethyl-cyclohexane (isophorone diisocyanate, IPDI). Aliphatic polyisocyanates containing more than two isocyanate groups are for example the derivatives of above mentioned diisocyanates like 1,6-diisocyanatohexane biuret and trimer. Examples of aromatic polyisocyanates that may be used are 1,4-diisocyanatobenzene (BDI), 2,4-diisocyanatotoluene (TDI), 1,1'-methylenebis[4-isocyanatobenzene] (MDI), xylilene diisocyanate (XDI), tetramethylxylilene diisocyanate (TMXDI), 1,5-naphtalene diisocyanate (NDI), tolidine diisocyanate (TODI) and p-phenylene diisocyanate (PPDI).

The amount of polyisocyanate compound (i) used for the synthesis of the urethane (meth)acrylate (A1) is generally in the range of from 10 to 70 percent by weight (wt %), preferably from 15 to 60 wt % and more preferably from 20 to 50 wt %. Weight percentages are herein relative to the total weight of compounds used to prepare urethane (meth) acrylates (A1).

Compounds (ii) typically are (meth)acrylated compounds. Most often they are (meth)acrylated compounds containing essentially one reactive group capable to react with isocyanate groups. Such compounds typically comprise at least one unsaturated function such as acrylic or methacrylic groups and one nucleophilic function capable of reacting with isocyanate. This can be a hydroxyl, amino and/or thiol group, but typically is a hydroxyl group.

Typically compounds (ii) are hydroxyl functional (meth) acrylates and more in particular (meth)acryloyl mono-hydroxy compounds, or compounds comprising one hydroxyl group and one or more (meth)acryloyl groups. Acrylates are particularly preferred.

Suitable are for instance the esterification products of aliphatic and/or aromatic polyols with (meth)acrylic acid having a residual average hydroxyl functionality of about 1.

Examples of suitable hydroxyl functional (meth)acrylates (ii) include but are not limited to hydroxyethyl (meth) acrylate, hydroxypropyl (meth)acrylate, hydroxybutyl (meth)acrylate, polyethyleneoxide mono(meth)acrylate, polypropyleneoxide mono(meth)acrylate, or any of those hydroxylated monomers further reacted with lactones or lactides which add to these hydroxyls in a ring-opening reaction.

Suitable are also the esterification products of aliphatic and/or aromatic polyols with (meth)acrylic acid having a residual average hydroxyl functionality of about 1 or higher. The partial esterification products of (meth)acrylic acid with tri-, tetra-, penta- or hexahydric polyols or mixtures thereof are preferred but it is also possible to use reaction products of such polyols with ethylene oxide and/or propylene oxide or mixtures thereof, or the reaction products of such polyols with lactones or lactides which add to these polyols in a ring-opening reaction until the desired residual hydroxyl functionality is reached. It is known to those skilled in the art that the (meth)acrylation of polyols proceeds to a mixture of (meth)acrylate components and that an easy and suitable way to characterize the mixture is by measuring its hydroxyl value (mg KOH/g). Suitable compounds (ii) are for instance the (meth)acrylic esters of linear and branched polyols in which at least one hydroxy functionality remains free. Particularly preferred are compounds comprising at least two (meth)acryl functions such as glycerol diacrylate, trimethylolpropane diacrylate, pentaerythritol triacrylate, ditrimethylolpropane triacrylate, dipentaerythritol pentaacrylate and their (poly)ethoxylated and/or (poly)propoxylated equivalents. Particularly preferred are pentaerythritol triacrylate (PETIA) and a dipentaerythrytol hydroxypentaacrylate (DPHA), a mixture containing essentially dipentaerythritol tetraacrylate, dipentaerythritol pentaacrylate and dipentaerythritol hexaacrylate.

Also suitable are $C_{1-4}$ hydroxyalkyl(meth)acrylate-((poly)lactone)$_t$ compounds, wherein t is an integer of from 1 to 10, preferably from 1 to 5. Preferably the (poly)lactone is a (poly)caprolactone. Examples of useful compounds in this category are CAPA M100 (PERSTORP) and PLACCEL FA2D (DAICEL CHEMICAL INDUSTRIES) and/or hydroxyethylcaprolactone acrylate (BASF). Other examples of suitable compounds (ii) are $C_1$ hydroxyalkyl(meth)acrylate-((poly)lactide)$_n$ compounds, wherein n is an integer between 1 and 10, preferably n is between 1 and 5 and most preferably n is between 2 and 4.

Also suitable are the reaction products of (meth)acrylic acid with aliphatic, cycloaliphatic or aromatic compounds that bear an epoxy functionality and that, optionally, further bear at least one (meth)acrylic functionality. It is also possible to use compounds obtained from the reaction of an aliphatic, cycloaliphatic or aromatic compound containing at least one carboxylic acid with another compound bearing an epoxy functionality and at least one (meth)acrylic functionality. Particularly suitable is the reaction of the glycidyl ester of a $C_9$-$C_{11}$ versatic acid with (meth)acrylic acid.

From the above in particular poly(meth)acryloyl monohydroxy compounds, or compounds comprising one hydroxyl group and two or more (meth)acryloyl groups are preferred.

The amount of compounds (ii) used for the synthesis of the urethane (meth)acrylate (A1) is generally in the range of from 10 to 90 wt %, preferably from 40 to 85 wt % and more preferably from 50 to 80 wt %. Weight percentages are herein relative to the total weight of compounds used to prepare urethane (meth)acrylates (A1).

Optionally, other hydroxyl functional compounds (iii) can be used for preparing urethane (meth)acrylates (A1) of the invention. Compounds (iii) typically are polyols and more in particular diols. In general compounds (iii) are saturated polyols.

By polyol (iii) is meant to designate an organic compound comprising at least two hydroxyl groups. The polyol (iii) can be selected from low molecular weight polyols having a number average weight of less than 300, preferably less than 200 Daltons; from high molecular weight polyols having a number average molecular weight of at least 300, preferably at least 400, more preferably at least 500 Daltons; or from any mixtures thereof. The high molecular weight polyol (iii) preferably has a number average molecular weight of at most 5,000, preferably at most 2,000, more preferably at most 1,000 Daltons.

Examples of suitable low molecular weight compounds (iii) include compounds like aliphatic or cycloaliphatic polyols such as ethyleneglycol (EG), propyleneglycol (PG), cyclohexane dimethanol (CHDM), glycerol (GLY), trimethylolpropane (TMP), ditrimethylolpropane (di-TMP), pentaerythritol (PENTA), dipentaerythritol (di-PENTA), or any other renewable polyols like fatty dimer diols, and the like.

Examples of high molecular weight polyols (iii) are polyester polyols, polyether polyols, polycarbonate polyols, polybutadiene polyols, polyacrylate polyols and silicone polyols, as well as combinations thereof. Preferred are polyester polyols, polycarbonate polyols and/or polyether polyols, having a molecular weight above 500 Daltons. Particularly preferred are polyhydroxylated polyester polyols. Examples of such compounds are well known in the art.

Where present, compounds (iii) are generally used in an amount from 1 to 95 wt %, preferably from 2 to 20 wt % more preferably from 3 to 10 wt %, and most preferably from 5 to 10 wt %. Weight percentages are herein relative to the total weight of compounds used to prepare urethane (meth)acrylates (A1).

In an embodiment of the invention, urethane (meth) acrylates are prepared from compounds (i), (ii) and the optional compound (iii) as identified above. Typically, the sum of the weight percentages of compounds (i), (ii) and (iii) equals 100% on a dry weight basis. In an embodiment of the invention compounds (iii) are used to prepare urethane (meth)acrylates (A11) of the invention. In yet another embodiment of the invention, no compounds (iii) are used to prepare compounds (A1) according to the invention. Especially preferred are urethane (meth)acrylates (A12) that are obtained from the reaction of at least one polyisocyanate (i) and at least one polymerizable ethylenically unsaturated compound (ii) containing at least one reactive group capable to react with isocyanate groups as described above. Typically, the sum of the weight percentages of compounds (i) and (ii) herein equals 100% on a dry weight basis.

Typically, urethane (meth)acrylates (A1) that are used in the invention have a molecular weight $M_W$ of between 400 and 20,000 Daltons. Usually the $M_W$ is at most 5,000 Daltons, typically at most 2,000 Daltons, and most typically at most 1,000 Daltons. Molecular weights can be measured by gel permeation chromatography using polystyrene standards but most typically they are calculated from the target molecule.

Optionally urethane (meth)acrylates (A1) of the invention can have residual amounts of hydroxyl functions. In general, the residual amount of hydroxyl functions is between 0 and 5 meq/g. Typically the residual amount of hydroxyl functions is at most 3 meq/g, more typically at most 1 meq/g.

Examples of suitable urethane (meth)acrylates (A1) are those commercialized as EBECRYL® 1290, EBECRYL® 220, EBECRYL® 270, EBECRYL® 264, EBECRYL® 294/25HD, EBECRYL® 4883, EBECRYL® 5129 and EBECRYL® 8210. These urethane (meth)acrylates can be diluted in a reactive diluent or be used in combination with other (meth)acrylated compounds.

Polyester (meth)acrylates (A2) used in the invention typically are obtained from the reaction of at least one polyol (iii) and at least one ethylenically unsaturated carboxylic acid (iv) or a suitable equivalent. Examples of suitable compounds (iv) include (meth)acrylic acid, β-carboxyethyl (meth)acrylate, crotonic acid, iso-crotonic acid, maleic acid, fumaric acid, itaconic acid, citraconic acid, 3-(meth)acrylamido-3-methylbutanoic acid, 10-(meth)acrylamido-undecanoic acid, 2-(meth)acrylamido-2-hydroxyacetic acid, vinyl acetic acid and/or allyl acetic acid. Acrylic acid and methacrylic acid, used alone or in combination, are preferred.

Suitable polyester (meth)acrylates (A2) are for instance aliphatic or aromatic polyhydric polyols which have been totally esterified with (meth)acrylic acid and may contain a residual hydroxyl functionality in the molecule; an easy and suitable way to characterize the product is thus by measuring its hydroxyl value (mg KOH/g). Suitable are the partial or total esterification products of (meth)acrylic acid with di-, tri-, tetra-, penta- and/or hexahydric polyols and mixtures thereof. It is also possible to use reaction products of such polyols with ethylene oxide and/or propylene oxide or mixtures thereof, or reaction products of such polyols with lactones and lactides, which add to these polyols in a ring-opening reaction. Examples of poly-unsaturated compounds from this category are dipropyleneglycol di-acrylate, trimethylolpropane tri-acrylate, glycerol tri-acrylate, pentaerythritol tetra-acrylate, di-trimethylolpropane tetra-acrylate, di-pentaerythritol hexa-acrylate and their (poly)ethoxylated and/or (poly)propoxylated equivalents, as well as mixtures thereof. Partial acrylation products from these examples are also considered.

Polyester (meth)acrylates (A2) with a higher molecular weight (e.g. a $M_W$ above 500 Daltons, preferably above 750 Daltons, more preferably above 1.000 Daltons) can also be obtained by reacting a hydroxyl group-containing polyester with (meth)acrylic acid, or by reacting a carboxylic acid group-containing polyester with a hydroxyalkyl (meth)acrylate such as for example 2-hydroxyethyl acrylate, 2- or 3-hydroxypropyl acrylate, etc., or with glycidyl (meth)acrylate. The polyester backbone can be obtained in a conventional manner by polycondensation of at least one mono- and/or polyhydroxy alcohol, such as ethylene glycol, propylene glycol, butanediol, neopentyl glycol, hexanediol, trimethylolpropane, bisphenol A, pentaerythritol, etc, or/and the ethoxylates and/or propoxylates thereof, with at least one mono- and/or polycarboxylic acid such as adipic acid, phthalic acid, isophthalic acid, terephthalic acid, trimellitic acid, etc. By using unsaturated compounds for the polyester synthesis, such as for example fumaric acid, maleic acid, itaconic acid, etc., polyesters bearing both (meth)acrylic and ethylenic unsaturations in the polymer chain, can be obtained. In addition, polylactones and/or polylactides can be used as polyester backbone. For example, poly(ε-caprolactone) obtained by ring-opening polymerization of ε-caprolactone, optionally in the presence of one or more polyhydroxy alcohol, can be used.

Typically, polyester (meth)acrylates (A2) have a $M_W$ of between 200 and 20,000 Daltons. Usually the $M_W$ is at most 5,000 Daltons, typically at most 1,000 Daltons, most typically at most 500 Daltons.

Suitable polyester acrylates (A2) are for instance those commercialized as EBECRYL®800, EBECRYL®810, EBECRYL®830, EBECRYL®884, and EBECRYL®885.

In a particular embodiment of the invention the ethylenically unsaturated polyester (A2) may be an alkyd, more in particular an alkyd (meth)acrylate.

The hydroxyl group-containing polyester or alkyd resin r that is typically used to prepare this compound (A2) is preferably an esterification product of a fatty acid a1 having from 8 to 30 carbon atoms, a polyhydric aliphatic alcohol a3 having at least three hydroxyl groups, and an aromatic, cycloaliphatic or linear or branched aliphatic carboxylic acid a4 having at least two carboxyl groups, or the anhydride thereof, and optionally an aliphatic or aromatic monocarboxylic acid a2 having at least two carbon atoms and not more than seven carbon atoms.

According to a specific embodiment of the invention, the polyester r comprises at least one ethylenic unsaturation in the molecule. This ethylenic unsaturation can be introduced by using an unsaturated fatty acid a1, and/or by adding one or more oils a5 containing at least one ethylenic unsaturation in the molecule. The presence of oils a5 is preferred, which oil particularly preferably has at least one ethylenic unsaturation in the molecule.

The fatty acids a1 are preferably linear or branched aliphatic monocarboxylic acids, and preferably have from 8 to 24 carbon atoms, and may also have ethylenic unsaturation. The fatty acid a1 that is used can be saturated, monounsaturated and/or polyunsaturated. By "polyunsaturated" is meant that the fatty acid comprises 2 or more double bonds. Useful fatty acids are, i.a., caprylic acid, pelargonic acid, capric acid, lauric acid, myristic acid, palmitic acid, stearic acid, and behenic acid, and also unsaturated fatty acids such as linolic acid, linolenic acid, eleostearic acid, oleic acid, ricinoleic acid, palmitoleic acid, gadoleic acid, and arachidonic acid, to name only a few. They may be used alone, or preferably, in mixture. Mixtures of fatty acids from natural sources may also be used, such as cotton oil fatty acid, coconut oil fatty acid, and sunflower oil fatty acid.

The aliphatic or aromatic monocarboxylic acid a2 having at least two carbon atoms and not more than seven carbon atoms which may optionally be used in the synthesis of the alkyd resin, are aliphatic linear or branched, or aromatic acids, such as butyric acid, isobutyric acid, 2,2-dimethylpentanoic acid, valeric acid, caproic acid, heptanoic acid, and preferably, benzoic acid.

The polyhydric aliphatic alcohols a3 have at least three hydroxyl groups, and preferably from three to ten carbon atoms. They may be linear or branched, and may preferably be one or more of glycerol, threitol, erythritol, sorbitol, mannitol, trimethylol ethane, trimethylol propane, pentaerythritol, ditrimethylol ethane, ditrimethylol propane, and dipentaerythritol.

The aromatic, cycloaliphatic or linear or branched aliphatic carboxylic acids a4 having at least two carboxyl groups preferably have at least four carbon atoms, or at least eight carbon atoms if they are aromatic, and are preferably one or more of glutaric acid, adipic acid, pimelic acid, suberic acid, sebacic acid, and the so-called dimeric fatty acid synthesised from unsaturated fatty acid by a dimerisation process. Aliphatic cyclic diacids may be the isomers of cyclopentane dicarboxylic acid, cyclohexane dicarboxylic acid (such as hexahydrophthalic acid, hexahydroterephthalic acid, and tetrahydrophthalic acid), aromatic diacids may be phthalic, isophthalic, and terephthalic acids, 4,4'-diphenyl dicarboxylic acid, and also higher functional acids, such as trimellithic acid and benzophenonetetracarboxylic acid. Where intramolecular anhydrides of these acids exist, they may, of course, also be used in the synthesis.

The oils a5 are esters of glycerol with fatty acids which preferably have at least one ethylenic unsaturation, or two or more of these. Preferably the oils are polyunsaturated oils, such as linseed oil, sunflower oil, perilla oil, or hempseed oil. Polyester or alkyd resins containing moieties derived from such at least monounsaturated oils, and preferably, polyunsaturated oils, lead to coating binders which can be used for dual cure systems, i. e. radical polymerisation induced by both irradiation, and air-drying.

The polyester or alkyd resins r that will be used to form the polyester (meth)acrylate (A2) are preferably prepared in a reaction where all components, the fatty acid a1, the optional aliphatic or aromatic monocarboxylic acid a2, the polyhydric alcohol a3, and the di- or polycarboxylic acid a4, and optionally, the oil a5, are charged into a reaction vessel and heated to a temperature of at least 100° C., preferably in the presence of an azeotrope former which forms an azeotrope with water generated in the polycondensation reaction, separation of the water formed, or distillation of the mixture of water and the azeotrope former, separation of water from the liquid mixture of the distillate which forms two phases upon condensation, and returning the azeotrope former into the reaction vessel. It is also possible to use two or more different compounds of at least one of the components a1 through a5 in the synthesis of the alkyd resin r. In another preferred embodiment, it is also possible to start the synthesis of the alkyd resin by using an oil as an educt (starting material), which is an ester of glycerol (which belongs to the group of a3), and fatty acids which may be the same or different, and belong to the group of a1. Useful oils include linseed oil, soybean oil, cotton seed oil, coconut oil, sunflower oil, rapeseed oil, and safflower oil.

Ethylenically unsaturated alkyds can be prepared by reacting a hydroxy functional alkyd resin r as described above with a suitable ethylenically unsaturated compound c which can be radically polymerised. Ethylenic unsaturation can be introduced in various ways. The ethylenically unsaturated compound c may for instance be attached to the alkyd resin backbone by an ester bond, in which case the ethylenically unsaturated compound c is an unsaturated acid c1 selected from the group consisting of alpha, beta-unsaturated aliphatic monocarboxylic acids, and monoesters of ethylenically unsaturated aliphatic dicarboxylic acids. Useful compounds c1 are particularly ethylenically unsaturated linear or branched aliphatic carboxylic acids having from 3 to 15 carbon atoms, such as acrylic and methacrylic acids, and their higher homologues such as ethacrylic acid, vinylacetic acid, crotonic, and isocrotonic acids. Other useful compounds are monoalkyl esters of ethylenically unsaturated dicarboxylic acids, such as monomethyl or monoethyl maleate.

Another possibility is attaching the unsaturated compound via a urethane bond, for example, an isocyanate functional ethylenically unsaturated compound c2 can be reacted with an alkyd resin r by addition to its hydroxyl groups, under formation of a urethane group. In this embodiment, the ethylenically unsaturated compound c used is an isocyanate-functional reaction product c2. c2 can be the reaction product of an unsaturated aliphatic hydroxy-functional compound c21 and a diisocyanate or polyfunctional isocyanate c22 having three or more isocyanate groups per molecule. In this case, it is preferred to use compounds c21 containing an average of more than one double bond to make compounds c2, containing an average of more than one double bound.

Alternatively, the alkyd resin r can be first reacted with a diisocyanate or a polyfunctional isocyanate c22 and then be further reacted with compound c21.

This latter possibility where modification of the hydroxy functional alkyd resin is effected by reaction with compounds c2 involves multi-step reactions, while the direct esterification described in the first embodiment using compound c1 involves only one step for functionalisation.

The reaction product of a hydroxy functional alkyd resin r and an ethylenically unsaturated compound c which can be radically polymerised and which is attached to the alkyd resin backbone by an ester linkage or a urethane linkage can be prepared by the following process:

If a compound according to the group of compounds c1 is used, the alkyd resin r is mixed with an esterification catalyst, and preferably, also a polymerisation inhibitor to avoid premature polymerisation of compound c1. This mixture is heated to a temperature of preferably from 70° C. to 120° C., homogenised, and lean air with an oxygen content of from 3% to 10% is bubbled though this composition. Compound c1 is then added, preferably in stoichiometric excess, while maintaining the lean air stream, and the reaction mass is heated to preferably from 115° C. to 145° C. The esterification reaction is preferably accelerated by removing the water formed in the condensation reaction by azeotropic distillation, and the reaction is continued until the acid value of the reaction mass which is monitored during the reaction indicates conversion of more than 90% of the hydroxyl groups in the alkyd resin. The azeotrope former and the excess of compound c1 are then removed, by distillation under reduced pressure, and the modified alkyd resin is isolated.

If a compound according to c2 is used, in a first step, the isocyanate functional ethylenically unsaturated compound c2 is prepared from an unsaturated aliphatic alcohol c21 and a diisocyanate or polyfunctional isocyanate c22 having three or more isocyanate groups per molecule, and this compound c2 is then reacted with the alkyd resin under formation of a urethane bond by addition to its hydroxyl groups, under formation of a urethane group.

Alternatively, in the first step, the alkyd resin r can be reacted with compound c22, and then this reaction product is further reacted with compound c21.

If an ethylenically unsaturated polyol u which can be radically polymerized and which is obtained from the reaction of a polyol u1 and ethylenically unsaturated compound c, in a further embodiment, is also present in the composition, its precursor u1, a polyol, is mixed with the alkyd resin r prior to reaction thereof with c, in which case a reaction product of r with c and a reaction product of u1 with c are formed concurrently. It is also possible to react the polyol u1 with a compound of class c which is the same as, or different from, the compound of class c which is to be used to modify the alkyd resin r. In this case, the reaction product u is formed separately, and this reaction product u is then admixed to r before reaction thereof with c, or the reaction product u is mixed with the reaction product rc of r and c.

(Poly)epoxy (meth)acrylates (A3) that are used in the invention can be obtained from the reaction of (meth)acrylic acid with epoxides and/or "polyepoxides", i.e. compounds comprising at least two epoxide functions. The polyepoxides are generally chosen from glycidyl ethers of aromatic or aliphatic alcohols, polyols and from cycloaliphatic polyepoxides. Preferred epoxides are diglycidylethers of aromatic, aliphatic and/or cycloaliphatic diols, such as diglycidyl ether of bisphenol-A, diglycidyl ether of bisphenol-F, diglycidylether of poly(ethylene oxide-co-propylene oxide), diglycidylether of polypropylene oxide, diglycidylether of hexanediol, diglycidylether of pentanediol, diglycidylether of butanediol. Particularly preferred is diglycidyl ether of bisphenol-A. Also epoxidized unsaturated fatty acid triglycerides or epoxidized novolacs can be used. Examples include epoxidized soya oil, epoxidized castor oil, epoxidized linseed oil and the like.

Polyether (meth)acrylates (A4) that are used in the invention can be prepared by esterification of hydroxyfunctional polyethers with an ethylenically unsaturated carboxylic acid like (meth)acrylic acid. For more examples—see compounds (iv) above.

Hydroxyfunctional polyethers are obtained by ring-opening homo- or copolymerization of cyclic ethers such as tetrahydrofuran, ethylene oxide and/or propylene oxide or can be prepared by reacting polyhydroxy alcohols with ethylene and/or propylene oxide.

Polycarbonate (meth)acrylates (A5) that are used in the invention can be prepared by esterification of hydroxyfunctional polycarbonates with an ethylenically unsaturated carboxylic acid like (meth)acrylic acid like. For more examples—see compounds (iv) above.

Poly(meth)acrylic (meth)acrylates (A6) that are used in this invention can be prepared by the radical polymerization of (meth)acrylic monomers in the presence of thermal radical initiators, transfer agents and optional (reactive) solvents; a chemical functionality is introduced on the acrylic backbone to ensure the subsequent grafting with suitable mono- or poly-(meth)acrylated compounds. For example, the (meth)acrylic oligomer bears carboxylic acid functionality and is grafted with glycidyl (meth)acrylate (or vice versa). Suitable (meth)acrylated (meth)acrylics of this type are commercialized as EBECRYL®1200.

In one particular embodiment, aqueous compositions (X) of the invention comprise at least one urethane (meth)acrylate (A1) as described above, and optionally at least one polyester (meth)acrylate (A2) as described above.

In another particular embodiment, aqueous compositions (X) of the invention comprise at least one polyester (meth)acrylate (A2) as described above.

In yet another particular embodiment, aqueous compositions (X) of the invention comprise at least one urethane (meth)acrylate (A1) and at least one polyester (meth)acrylate, more in particular at least one polyester (meth)acrylate (A2) as described above.

In an embodiment of the invention, compositions (X) of the invention comprise two or more different compounds (A), that typically are selected from two or more of the group of: urethane (meth)acrylates (A1), polyester (meth)acrylates (A2), polyepoxy (meth)acrylates (A3), polyether (meth)acrylates (A4), polycarbonate (meth)acrylates (A5) and/or poly(meth)acrylic (meth)acrylates (A6) as described above. Possibly two urethane (meth)acrylates (A1) of a different type are present. Possibly two polyester (meth)acrylates (A2) of a different type are present. In yet another embodiment of the invention at least one urethane (meth)acrylate (A1) and at least one polyester (meth)acrylate (A2) are present in the energy curable aqueous composition (X) according to the invention.

Typically, the water-insoluble ethylenically unsaturated compound (A) used in the invention have a dynamic viscosity at 60° C. of from 0.5 to 20, preferably from 1 to 16 Pa·s.

As used herein the term "(meth)acrylic polymer" (B1) refers to a polymer that is prepared from the radical polymerization of one or more (meth)acrylic monomers. As used herein the term "(meth)acrylic hybrid" (B2) refers to a polymer that is prepared from one or more (meth)acrylic monomers as well as from one or more other ethylenically unsaturated monomers and/or from one or more unsaturated fatty acids.

Compounds (B) in the context of the invention typically are emulsifiers that advantageously are compatible with the energy curable compounds (A) present in the composition (X). In themselves compounds (B) may be sufficient to obtain a stable aqueous composition (typically an emulsion).

Yet, results were improved when at least one compound (B) was used together with at least one non-ionic emulsifier (D) as defined infra.

In embodiments of the invention, the compound (B) may contain energy curable functional groups, or more in particular "ethylenically unsaturated groups". The energy curable functional groups preferably originate from the at least one unsaturated fatty acid (b1) (see infra) and preferably they are not (meth)acrylate groups. Double bonds, when present in the compounds (B), in a preferred way are introduced via unsaturated fatty acids.

The ionic functional groups of the compounds (B) may be selected from acidic functional groups and from basic functional groups, but preferably they are acidic functional groups. Examples of possible acidic groups are carboxylic acid groups, sulfonic acid groups and/or phosphonic acid groups. Acidic groups most preferably are carboxylic acid groups.

In an embodiment of the invention the compounds (B) of the invention do not contain any energy curable functional groups, more in particular do not contain any ethylenically unsaturated groups. In another embodiment though, compounds (B) of the invention may contain some energy curable functional groups, more in particular some residual ethylenically unsaturated groups.

In a preferred embodiment of the invention the compound (B) of the invention is a fatty acid-modified, meaning that it has a fatty acid monomeric unit built in its backbone. Such a fatty acid unit will typically be incorporated in the compounds (B) by preparing the compounds (B) via radical polymerization of monomers comprising at least one unsaturated fatty acid (b1). The unsaturated fatty acid can be selected from monounsaturated and/or polyunsaturated fatty acids.

Preferably, compounds (B) of the invention contains no (meth)acrylate groups.

The compounds (B) used in the invention may for instance be obtained by a process comprising the steps of:
(a) Preparing a compound (B) by radical polymerization of monomers comprising:
  Optionally, at least one unsaturated fatty acid (b1),
  At least one ethylenically unsaturated monomer (b2) containing at least one ionic functional group or a group capable of forming an ionic functional group when contacted with water,
  At least one ethylenically unsaturated monomer (b3) different from (b1) and (b2),
  wherein at least one of the ethylenically unsaturated monomers (b2) and/or at least one of the ethylenically unsaturated monomers (b3) are (meth)acrylic monomers, and
(b) Neutralizing totally or partially the ionic groups of polymer (B) and dissolving it in water to form a compound (B) containing neutralized ionic functional groups.

The present invention is particularly suited to form stable aqueous compositions (X), more in particular stable emulsions. This is especially true when compounds (B) are prepared by radical polymerization of monomers comprising at least one fatty acid. The unsaturated fatty acid may be a monounsaturated and/or a polyunsaturated fatty acid.

The iodine value of compounds (B) obtained as such may range from 0 to 45 g iodine/100 g of compound (B), as measured via DIN 53241-1 (a method for measuring iodine values using a Wijs solution). In a particular embodiment of the invention the iodine value is from 10 to 45, more in particular from 20 to 45 g iodine/100 g of compound (B).

In preferred embodiments of the present invention, the compounds (B) bears acidic groups and has an acid value of at least 140 mg KOH/g.

The neutralized compound (B) of the invention is preferably obtained by a process comprising the steps of:
(a) preparing an compound (B) having an acid value when contacted with water of at least 140 mg KOH/g by radical copolymerization of monomers comprising:
optionally, at least one unsaturated fatty acid (b1), which possibly is a polyunsaturated fatty acid (b1),
at least one ethylenically unsaturated monomer (b2) containing at least one acid group or group capable of forming an acid group when contacted with water, and
at least one other ethylenically unsaturated monomer (b3) different from (b1) and (b2),
wherein at least one of the ethylenically unsaturated monomers (b2) and/or at least one of the ethylenically unsaturated monomers (b3) are (meth)acrylic monomers, and
(b) neutralizing totally or partially the acid groups of this copolymer (B) and dissolving it in water to form a totally or partially neutralized copolymer (B).

The neutralized compound (B) of the invention even more preferably is obtained by a process comprising the steps of:
(a) preparing an compound (B) having an acid value when contacted with water of at least 140 mg KOH/g by radical copolymerization of monomers comprising:
at least one unsaturated fatty acid (b1), which possibly is a polyunsaturated fatty acid (b1),
at least one ethylenically unsaturated monomer (b2) containing at least one acid group or group capable of forming an acid group when contacted with water, and
at least one other ethylenically unsaturated monomer (b3) different from (b1) and (b2),
wherein at least one of the ethylenically unsaturated monomers (b2) and/or at least one of the ethylenically unsaturated monomers (b3) are (meth)acrylic monomers, and
(b) neutralizing totally or partially the acid groups of this copolymer (B) and dissolving it in water to form a totally or partially neutralized copolymer (B).

The unsaturated fatty acid (b1) can be selected from mono and/or polyunsaturated fatty acids. The copolymer (B) prepared at step (a) may be a random, alternating or block copolymer. It is preferably a random copolymer.

The copolymerization in step (a) takes place by radical copolymerization. This may take place in a manner known to the skilled person by conventional methods, particularly by radical polymerization using thermal radical initiators. Examples of suitable thermal radical initiators include peroxides, such as benzoyl peroxide or di-tert-butyl peroxide, azo compounds, such as azo-bis-isobutyronitrile, and the like. The initiators may be used, for example, in amounts from 0.01 to 5.0 wt % of the starting monomers, preferably from 2.0 to 5.0 wt %.

To achieve a good control of the molecular weight and its distribution, a chain transfer agent, preferably of the mercaptan type, such as n-dodecylmercaptan, tert-dodecanethiol, iso-octylmercaptan, n-octylmercaptan, n-butyl-3-mercapto propionate or of the carbon halide type, such as carbon tetra-bromide, bromotrichloromethane, can also be added in the course of the reaction. The chain transfer agent is generally used in amounts up to 5 wt % of the monomers used in the copolymerization of step (a).

The copolymerization of step (a) is generally carried out at a temperature from 60 to 180° C., preferably under an inert gas atmosphere. An organic solvent may be used. However, the copolymerization of step (a) generally takes place in the absence of substantial amounts of organic solvent, usually less than 1 wt % of solvent relative to the total amount of reagents, preferably less than 0.2 wt %. In the case a solvent is used at step (a), it is removed in vacuum after completion of the reaction.

The copolymerization is generally performed until the conversion of monomers is at least 97%, quantified by the reaction product solid content according to DIN EN ISO 3251.

The monomer mixture used in step (a) typically comprises monomers (b1), (b2) and (b3). In an embodiment of the invention monomers (b1), (b2) and (b3) sum up to 100%.

The unsaturated fatty acid (b1) is a hydrocarbon compound comprising at least one carboxylic acid group and an aliphatic chain of at least 6 carbon atoms, comprising at least one carbon-carbon double bond. The aliphatic chain preferably has at least 8 carbon atoms and not more than 40 carbon atoms. The unsaturated fatty acid (b1) is generally an unsaturated aliphatic monocarboxylic acid derived from an animal or vegetable fat, oil or wax.

Suitable unsaturated fatty acids (b1) include tall oil fatty acids, suberin fatty acids, cutin fatty acids, plant oil fatty acids and their mixtures in general. Preferred unsaturated fatty acids (b1) to be used in the present invention alone or in mixture include tall oil fatty acids, suberin fatty acids, linseed oil fatty acids, soybean oil fatty acids, rapeseed oil fatty acids, rape oil fatty acids, sunflower oil fatty acids, olive oil fatty acids, castor oil fatty acids, safflower oil fatty acids, hemp seed oil fatty acids, walnut oil fatty acids, poppy seed oil fatty acids, corn oil fatty acids, cotton seed oil fatty acids, mustard oil fatty acids, oiticica oil fatty acids, peanut oil fatty acids, *perilla* oil fatty acids, rubber-seed oil fatty acids, sesame oil fatty acids, tung oil fatty acids and the like, which contain a significant amount of conjugated or non-conjugated double bonds. Preferred unsaturated fatty acids (b1) have an iodine number of at least 50 as measured according to DIN 53241 T 1, more preferred fatty acids have an iodine number of at least 100. Most preferred are soybean oil fatty acids, linseed oil fatty acids, tall oil fatty acids and mixtures thereof. They can be used alone or in mixture with other unsaturated fatty acids (b1) as described here above.

An ethylenically unsaturated monomer (b2) particularly suitable for use in the present invention is a compound comprising at least one acid group or group capable of forming an acid group when contacted with water and at least one ethylenically unsaturated group. By a "group capable of forming an acid group" is meant any group such as anhydrides and esters able to lead to the formation of an acid group when contacted with water in suitable conditions. Esters able to lead to the formation of an acid group when contacted with water are typically activated esters such as —C(=O)—O—R, wherein R is an electron-withdrawing activating group such as N-hydroxysuccinimide or the like. Those groups can be converted into acid groups by conventional methods known to the skilled person. When present, these groups are converted in acid groups at the end of step (a) or during step (b).

Suitable monomers (b2) include (meth)acrylic acid, β-carboxyethyl(meth)acrylate, crotonic acid, maleic acid, fumaric acid, itaconic acid, mesaconic acid, methylenemalonic acid, citraconic acid and their anhydrides, 4-methacryloyloxyethyl trimellitate anhydride, (meth)acrylic acid N-hydroxysuccinimide ester, 2-(meth)acrylamido-2-methyl-propanesulfonic acid, (meth)acrylamidosulfonic acid, vinylsulfonic acid, allylsulfonic acid, vinylphosponic acid, allylphosphonic acid and mixtures thereof. The monomer (b2) is preferably (meth)acrylic acid, crotonic acid or mixtures thereof, more preferably (meth)acrylic acid, most preferably acrylic acid.

The ethylenically unsaturated monomer (b3) can be any ethylenically unsatured compound polymerizable by radical polymerization known to the skilled person that is different from (b1) and (b2).

Examples of such monomers (b31) include styrenic derivatives such as styrene, vinyltoluene, alpha-methylstyrene, ethylstyrene, isopropylstyrene, tert-butylstyrene, 2,4-dimethylstyrene, diethylstyrene, o-methyl-isopropylstyrene, chlorostyrene, fluorostyrene, iodostyrene, bromostyrene, 2,4-cyanostyrene, hydroxystyrene, nitrostyrene, phenylstyrene.

Monomers (b32) can be selected from esters of (meth) acrylic and crotonic acid with saturated linear or cyclic alcohols containing 1 to 20, more preferably from 1 to 14, carbons on the alkyl or cyclic group. Examples include but are not limited to alkyl(meth)acrylates such as methyl (meth)acrylate, ethyl (meth)acrylate, propyl (meth)acrylate, butyl (meth)acrylate, pentyl (meth)acrylate, hexyl (meth) acrylate, heptyl (meth)acrylate, octyl (meth)acrylate, nonyl (meth)acrylate, decyl (meth)acrylate, undecyl (meth)acrylate, dodecyl (meth)acrylate, tridecyl (meth)acrylate, tetradecyl (meth)acrylate and isobornyl (meth)acrylate. Monomers (b32) can also be selected from heterocyclic (meth) acrylates like for instance tetrahydrofurfuryl (meth)acrylate. Monomers (b32) can also be selected from functionalized (meth)acrylates such as epoxy-functional (meth)acrylates, especially glycidyl (meth)acrylate, and hydroxyl-functionalized (meth)acrylates, such as hydroxyalkyl (meth)acrylates. Some non limiting examples are hydroxymethyl (meth)acrylate, hydroxyethyl (meth)acrylate, hydroxypropyl (meth)acrylate, hydroxybutyl (meth)acrylate, hydroxypentyl(meth)acrylate, hydroxyhexyl (meth)acrylate hydroxyheptyl (meth)acrylate, hydroxyoctyl (meth)acrylate, hydroxynonyl (meth)acrylate, hydroxydecyl (meth)acrylate, hydroxyundecyl (meth)acrylate, hydroxydodecyl (meth) acrylate, hydroxytridecyl (meth)acrylate, hydroxytetradecyl (meth)acrylate.

Further usable functionalized monomers (b33) include (meth)acrylamide, vinyl acetate, (meth)acrylonitrile, N-vinylformamide, N-vinylpyrrolidone, N-butoxymethyl (meth) acrylamide, N-methylol (meth)acrylamide and monomers that contain besides a polymerizable group such as a vinyl, (meth)acrylamide or (meth)acryl group also a keto group, such as diacetone (meth)acrylamide; an aceto acetoxy group, such as acetoacetoxyethyl (meth)acrylate or an ureido group (also called a 2-Oxo-1-imidazolidinyl group), such as N-(2-(meth)acryloyloxyethyl)-ethylene urea (also called 2-(2-Oxo-1-imidazolidinyl)ethyl (meth)acrylate) or ureido (meth)acrylate).

Mixtures of any of the listed monomers can also be used.

Preferred monomers (b3) used in the present invention are styrene, vinyltoluene, alpha-methylstyrene, ethylstyrene, (meth)acrylamide, diacetone (meth)acrylamide, isobornyl (meth)acrylate, methyl (meth)acrylate, ethyl (meth)acrylate, propyl (meth)acrylate, butyl (meth)acrylate, pentyl (meth) acrylate, hexyl (meth)acrylate, heptyl (meth)acrylate, octyl (meth)acrylate, vinyl acetate, ureido(meth)acrylate and mixtures thereof.

Most preferred monomers (b3) used in step (a) of the present invention are styrene, alpha-methylstyrene, (meth) acrylamide, diacetone (meth)acrylamide, isobornyl (meth) acrylate, methyl (meth)acrylate, and mixtures thereof.

More preferably, monomers (b3) used in step (a) of the present invention are those having a glass transition temperature (Tg) of their homopolymerisate of at least, more preferably higher than, 50° C. such as styrene, alpha-methylstyrene, (meth)acrylamide, diacetone (meth)acrylamide, isobornyl (meth)acrylate, methyl methacrylate, and mixtures thereof.

A copolymer (B) of the invention is typically obtained from:
0 to 50 wt % (percentage by weight), preferably from 5 to 50 wt % of at least one unsaturated fatty acid (b1), which possibly is a polyunsaturated fatty acid (b1),
5 to 90 wt % of at least one ethylenically unsaturated monomer (b2),
5 to 80 wt % of at least one ethylenically unsaturated monomer (b3),
based on the sum of (b1), (b2) and (b3) on a dry weight basis,
wherein at least one of the ethylenically unsaturated monomers (b2) and/or at least one of the ethylenically unsaturated monomers (b3) are (meth)acrylic monomers. In an embodiment of the present invention, (b1), (b2) and (b3) sum up to 100 wt % on a dry weight basis.

The amount of the unsaturated fatty acids (b1) used in the preparation of copolymers (B), when unsaturated fatty acids (b1) are present, is preferably at least 10 wt %, more preferably at least 15 wt % and preferably it does not exceed 45 wt %, more preferably it does not exceed 40 wt %, most preferably it does not exceed 39 wt %.

Typically, a portion of the unsaturated fatty acid (b1) used in the preparation of copolymers (B) will not be incorporated in the copolymer (B) and will remain free and form a mixture with the copolymer (B). This proportion of free unsaturated fatty acid (b1) typically represents 20 to 40 wt % of the unsaturated fatty acid (b1) used in the preparation of copolymer (B). Most typically, this proportion is from 25 to 35 wt %. The iodine value of the copolymer (B) obtained when fatty acids (b1) have been used for its preparation is preferably from 10 to 45, more preferably from 20 to 45 g iodine/100 g of copolymer (B).

The amount of the ethylenically unsaturated monomer (b2) used in the preparation of compounds (B) is preferably at least 7 wt %, more preferably at least 10 wt % and preferably it does not exceed 80 wt %, more preferably 60 wt %.

The amount of the ethylenically unsaturated monomer (b3) used in the preparation of compounds (B) is preferably at least 10 wt %, more preferably at least 15 wt % and preferably it does not exceed 75 wt %, more preferably 70 wt %.

The energy curable aqueous composition (X) according to the invention, typically comprises from 50 to 99.9 wt %, preferably 80 to 98 wt %, more preferably from 87 to 97 wt %, of water-insoluble ethylenically unsaturated compounds (A) based on the sum of (A), (B) and (D) on a dry weight basis.

The energy curable aqueous composition (X) according to the invention, typically comprises from 0.1 to 50 wt %, preferably from 2 to 20 wt %, more preferably 3 to 13 wt % of compounds (B) and (D) based on the sum of (A), (B) and (D) on a dry weight basis.

The energy curable aqueous composition (X) according to the invention, typically comprises from 0.05 to 25 wt %, preferably from 1 to 10 wt %, more preferably from 2 to 6 wt % of compound (B) based on the sum of (A), (B) and (D) on a dry weight basis.

The energy curable aqueous composition (X) according to the invention, typically comprises from 0.05 to 25 wt %, preferably from 1 to 10 wt %, more preferably from 2 to 6% of compound (D) based on the sum of (A), (B) and (D) on a dry weight basis.

The compounds (B) of the invention typically have an acid value when contacted with water of at least 140 mg KOH/g, preferably of at least 150 mg KOH/g, more preferably at least 160 mg KOH/g and most preferably at least 170 mg KOH/g. Particularly preferred are compounds (B) having an acid value of at least 180 mg KOH/g. Most preferred are compounds (B) having an acid value of at least 200 mg KOH/g. The acid value typically does not exceed 400 mg KOH/g, preferably 300 mg KOH/g, more preferably 280 mg KOH/g, most preferably 270 mg KOH/g. The acid value is typically determined according to DIN EN ISO 2114. Monomers (b1) and monomers (b2) containing acid groups or groups capable of forming an acid group when contacted with water contribute to the acid value of compounds (B).

Compounds (B) of the invention generally have a weight average molecular weight (Mw) of at least 2000 Da (Dalton), preferably at least 3000 Da. The weight average molecular weight generally does not exceed 20000 Da, preferably 15000 Da as determined according to DIN 55672-1. In embodiments, compounds (B) may have a Mw of from 3000 to 10000, preferably from 4000 to 9000 and more preferably from 5000 to 8000 Da.

The glass transition temperature (Tg) of compounds (B) of the invention is preferably at least 0° C., more preferably at least 35° C. as determined according to DIN EN 61006.

In step (b) of the present invention, the ionic (e.g. acid) groups of compounds (B) obtained at step (a) are totally or partially neutralized with a neutralizing agent and the copolymer is dissolved in water. By totally or partially neutralized is meant in the present invention that all or at least part of the acid groups present in the copolymer (B) are neutralized (e.g. by a basic compound if the ionic groups are acid groups).

Examples of neutralizing agents (C) useful to neutralize compounds (B) of the invention are ammonia, amines and inorganic hydroxides. Inorganic hydroxides are for instance sodium or potassium hydroxide. Examples of suitable amines are primary, secondary, tertiary amines, cyclic amines and mixtures thereof. Examples of such amines are primary, secondary or tertiary alkylamines like methylamine, dimethylamine, trimethylamine, ethylamine, diethylamine, triethylamine, ethanolamine, diethanolamine, triethanolamine, cyclic amines like pyridine, piperidine, piperazine or the like. Ammonia and amines are advantageous as they tend to form solutions of a low viscosity compared to inorganic hydroxides Preferred neutralizing agent are tertiary alkylamines.

A solution of the at least partially neutralized compounds (B), is generally prepared by mixing the copolymers (B) obtained at step (a) and a water/neutralizing agent solution at a temperature of at least 20° C., preferably at least 40° C., more preferably at least 50° C. The temperature generally does not exceed 90° C., preferably 85° C., more preferably 80° C.

The amount of neutralizing agent in the mixture in general is chosen to yield the desired degree of neutralization of the acid groups present the compound (B). The degree of neutralization is generally defined as the percentage of acid groups neutralized in the compound (B).

The degree of neutralization typically is at least 30%, preferably at least 60% and more preferably at least 70% based on the total number of acid groups present in compounds (B) when contacted with water. Preferably, the degree of neutralization may be from 70 to 90% or 75 to 85%. The total number of acid groups refers to the acid groups originating from monomer (b1) and monomer (b2) containing acid groups or groups capable of forming an acid group when contacted with water.

The mixture of the at least partially neutralized compound (B) and water/neutralizing agent (C) mixture is stirred until a homogeneous solution is obtained.

The nonionic emulsifier (D) is capable of bringing compounds (A) into emulsion or dispersion, advantageously in the presence of one or more of compounds (B). An advantage is that by using at least one nonionic emulsifier (D) together with at least one compound (B) of the invention, one is able to maintain the colloidal stability over a large range of temperatures, for instance from 4 up to 60° C., more typically from room temperature up to 60° C.

An advantage of the invention is that colloidal stability at 60° C. can be maintained for at least one day, typically a few days, preferably at least 4 days, even up to 10 days and more.

The nonionic emulsifier (D) comprising alternating polyalkylene oxide segments, said nonionic emulsifier (D) having an HLB value of at least 4.5 is preferably an emulsifier (D) comprising alternating polyethylene oxide and polypropylene oxide segments, wherein said emulsifier optionally bears one or more groups selected from alkyl groups, aryl groups, hydroxyl groups and/or copolymerizable ethylenically unsaturated groups. Usually these optional groups are selected from: alkyl groups, hydroxyl groups and/or copolymerizable ethylenically unsaturated groups. Even more preferred are alkyl groups and/or copolymerizable ethylenically unsaturated groups.

The optional alkyl group can be a $C_1$-$C_{18}$ alkyl group but typically it is a $C_{1-14}$ alkyl group, more typically it is a $C_{1-12}$ alkyl group, and most typically a $C_{1-4}$ alkyl group (like e.g. a butyl group).

Typically, the copolymerizable ethylenically unsaturated groups that may be present on nonionic emulsifers (D) of the invention, are selected from allyl groups and/or (meth) acryloyl groups. Most typically they are (meth)acryloyl groups. The above-mentioned optional groups typically are terminal groups.

Typically, these optional groups are terminal groups.

In an embodiment of the invention, the nonionic emulsifier (D) does not bear any of the above optional groups. In another embodiment of the invention, the nonionic emulsifier (D) is bearing at least one of the above optional groups. Usually these optional groups are selected from: alkyl groups, hydroxyl groups and/or copolymerizable ethylenically unsaturated groups. Even more preferred are alkyl groups and/or copolymerizable ethylenically unsaturated groups. Typically compounds (D) are characterized by an amount of copolymerizable ethylenically unsaturated groups from 0 to 1 meq/g.

In an embodiment of the invention, the nonionic emulsifier (D) bears no ethylenically unsaturated groups, more in particular no (meth)acryloyl groups. In another embodiment of the invention, the nonionic emulsifier (D) bears ethylenically unsaturated groups, more in particular (meth)acryloyl groups. (Meth)acryloyl groups, when present, are most often terminal (meth)acryloyl groups.

When ethylenically unsaturated groups are present on the nonionic emulsifier (D) then often the amount of copolymerizable ethylenically unsaturated groups is at least 0.05 meq per g of compounds (D). More often this amount is then at least 0.1 meq/g, and most often at least 0.15 meq/g. This amount can be at least 0.2 meq/g. Typically this amount is at most 1 meq/g. Often this amount is then at most 0.5 meq/g, more often at most 0.4 meq/g and most typically at most 0.3 meq/g.

Typically, nonionic emulsifiers (D) have a content of alternating polyalkylene oxide units that is at least 22.5% by weight relative to the total weight of the emulsifier (D), usually at least 50% by weight. More typically however this content is at least 75% by weight, more preferably at least 90% by weight, most preferably at least 95% by weight and the most preferably at least 98% by weight. This weight % can be up to 100% (in case that the optional groups specified above are nor present). In a preferred embodiment however at least one of these groups is present and preferably the emulsifier (D) is an asymmetric molecule meaning that end groups are different at both sides of the molecule.

Di-bloc and/or tri-bloc emulsifiers (D) are generally preferred.

In an embodiment of the invention the emulsifier (D) has an amount of oxyethylene units derived from polyethylene glycol of from 20% to 80% in weight, relative to the total weight of the emulsifier (D).

In an embodiment of the invention the emulsifier (D) has an amount of oxypropylene units derived from polypropylene glycol of from 20% to 80% in weight, relative to the total weight of the emulsifier (D).

The emulsifier (D) of the invention is a nonionic emulsifier. Acid groups (like carboxylic acid groups, sulfonic acid groups or phosphonic acid groups), amino groups or epoxy groups, if present at all initially, typically are chemically grafted in a second step to provide another functionality for the emulsifier, like e.g. (meth)acryloyl groups, so that the resulting emulsifier (D) is a nonionic emulsifier. For instance, acid groups like carboxylic acid groups can be used to provide (meth)acryloyl groups to the emulsifier (D) by reaction with a (meth)acrylating compound comprising functional groups capable of reacting with said carboxylic acid groups as well as at least one copolymerizable ethylenically unsaturated group.

Polyethylene oxide moieties (or segments) typically have a degree of polymerization comprised between 6 and 100 units. Often the degree of polymerization is at least 20, more preferably at least 40. Often the degree of polymerization is at most 80 and usually at most 60. Polypropylene oxide moieties (or segments) typically have a degree of polymerization comprised between 6 and 100 units. Often the degree of polymerization is at least 10, more preferably at least 20. Often the degree of polymerization is at most 80 and usually at most 60.

The term "HLB" stands for the "Hydrophilic-Lipophilic Balance" of the emulsifier(s) and is defined as the weight percentage of polyethylene oxide in the molecule, divided by 5. By definition, HLB values are restricted between the excluded values of 0 and 20 for nonionic emulsifiers. HLB values can be measured by direct or indirect methods. Typically though, HLB values are determined by NMR spectroscopy, for instance using the method below.

In the present invention, the HLB value of emulsifiers was investigated by $^1$H-COSY NMR spectroscopy on a Bruker®Avance 500 MHz spectrometer with deuterated chloroform $CDCl_3$ as solvent. For instance, in the case of the analysis of Maxemul® 7101, the molar propoxy-contribution —$CH_2$—$CH(CH_3)$—O— is determined by the integration of the 3 protons $H^1$ of Methyl ($CH_3$) with a chemical shift at 1.15 ppm. The molar ethoxy-contribution —$CH_2$—$CH_2$—O— is determined by the integration of the 4 protons ($H^4$+$H^5$) of the methylene (—$CH_2$—$CH_2$—) segment from ethoxy-unit subtracted with the additional contribution of methylene (—CH—$CH_2$—) from propoxy-unit ($H^2$+$H^3$) at the chemical shift range between 3.30 to 3.70 ppm.

The molar ethoxy/propoxy ratio (r) is defined as ($[[(H^4+H^5)-(H^2+H^3)]/4])/([H^1/3])$, and permits the easy calculation of the HLB=$20r/(1+r)$

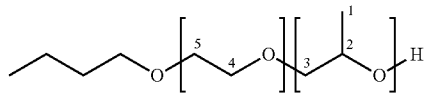

In general, the HLB value (or the weighted average of HLB values) is at least 5, typically is at least 6. Preferably the HLB value is at least 7, more preferably at least 8, even more preferably at least 9, and most preferably at least 10. Typically, the HLB value is at most 19, preferably at most 18, more preferably at most 17, and most preferably at most 16. If the HLB value is too high then there is a risk of obtaining and stabilizing foams. A too low or too high HLB value often has a strong negative impact on stability of the oil-in-water composition.

Preferred are HLB values (or a weighted average of HLB values) between 7 and 19, more preferred are values between 8 and 18, even more preferred are values between 9 and 17, more typical are values between 10 and 17, and most preferred are values between 10 and 16.

Emulsifiers with a high HLB value will be more hydrophilic (water soluble) and emulsifiers with a low HLB value will be more lipophilic (oil soluble).

Possibly, a blend of emulsifiers is used with a weighted average of HLB values of at least 4.5, typically at least 5, more typically at least 6, and preferably at most 19 (for preferred values see above). In said case, the HLB value referred to typically is the weighted average of the HLB values of the blended emulsifiers.

It is indeed known as a rule to those skilled in the art that the HLB value of an emulsifier blend is the weighted average of the HLB values of the blended emulsifiers, i.e. a 50:50 blend of emulsifiers with HLB=4 and HLB=16 will have an HLB=10. Similarly, the HLB requirement (Req) of an oil blend is the weighted average of the HLB requirements of the blended components, i.e. a 50:50 blend of oils with Req=10 and Req=14 will have a Req=12.

In an embodiment of the invention, emulsifiers (D) are represented by the general formula (I):

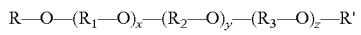

wherein
  each of $R_1$, $R_2$ and $R_3$ independently is a linear or branched $C_2$-$C_{12}$ alkyl;
  $R_1 \neq R_2$; and $R_3 \neq R_2$;
  X=6-100;
  Y=6-100;
  Z=0-100;
  R and R' each independently are selected from the following: alkyl groups (typically linear or branched $C_1$-$C_{18}$ alkyl), aryl groups (typically linear or branched $C_6$-$C_{24}$ aryl), (meth)acryloyl groups or —H.

In one embodiment of the invention, $R_3=R_1$. In another embodiment of the invention, $R_3 \neq R_1$. Typically, $R_1$, $R_2$ and $R_3$ are selected from -ethyl and -propyl. Preferred are emulsifiers of the type EO-PO and/or of the type EO-PO-EO (see infra). EO stands for an ethylene oxide building bloc (i.e. oxyethylene units) while PO stands for a propylene oxide building block (i.e. oxypropylene units). In one embodiment of the invention, R═R'. In another embodiment of the invention, R≠R'. If z≠0, then z is typically=6-100.

Preferred degrees of polymerization are found further down.

In one embodiment of the invention, the nonionic emulsifier (D) is one represented by the formula (Ia):

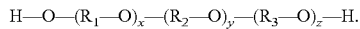
H—O—(R$_1$—O)$_x$—(R$_2$—O)$_y$—(R$_3$—O)$_z$—H.

In one embodiment of the invention, the nonionic emulsifier (D) is one represented by the formula (Ib):

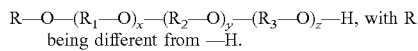
R—O—(R$_1$—O)$_x$—(R$_2$—O)$_y$—(R$_3$—O)$_z$—H, with R being different from —H.

In one embodiment of the invention, the nonionic emulsifier (D) is one represented by the formula (Ic):

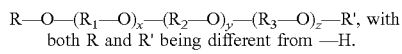
R—O—(R$_1$—O)$_x$—(R$_2$—O)$_y$—(R$_3$—O)$_z$—R', with both R and R' being different from —H.

Possibly a mix of two or more of the above nonionic emulsifiers (D) is being used.

Typically, emulsifiers (D) have a molecular weight $M_W$ of between 700 and 15.000 Daltons. Molecular weights typically are calculated. Typically, the $M_W$ is at least 2.000 Daltons, more preferably at least 3.000 Daltons and most preferably at least 4000 Daltons. Preferably the MW is at most 10,000 Daltons, more preferably at most 8,000 Daltons and most preferably at most 6,000 Daltons.

Typically, emulsifiers (D) of the type EO-PO have a molecular weight MW of between 700 and 10,000 Daltons. Preferably the MW is at least 2,000 Daltons, more preferably at least 3,000 Daltons and most preferably at least 4,000 Daltons. Preferably the MW is at most 8,000 Daltons, more preferably at most 7,000 Daltons and most preferably at most 6,000 Daltons.

Typically, emulsifiers (D) of the type EO-PO-EO or PO-EO-PO have a molecular weight MW of between 800 and 15,000 Daltons. Preferably the MW is at least 2,000 Daltons, more preferably at least 3,000 Daltons and most preferably at least 4,000 Daltons. Preferably the MW is at most 10,000 Daltons, more preferably at most 8,000 Daltons and most preferably at most 6,000 Daltons.

Examples of commercially available compounds (D) are for instance Maxemul®7101 (Croda), Maxemul®7102 (Croda) and Hydropalat® WE 3162 (BASF).

The energy curable aqueous composition (X) typically comprises:
from 12 wt % to 88 wt % of one or more compounds (B),
from 88 wt % to 12 wt % of one or more nonionic emulsifiers (D), based on the sum of (B) and (D) on a dry weight basis.

The energy curable aqueous composition (X) of the invention optionally can further comprise at least one co-solvent (E). Preferred are co-solvents that are high boiling solvents, that are capable of reducing the process viscosity and of increasing the colloidal stability of the final emulsion, for instance by modifying the HLB request of the organic phase. Particularly preferred are co-solvents having a boiling point between 100° C. and 300° C., preferably between 150° C. and 250° C., most preferably between 175° C. and 225° C., at 760 mm Hg.

Particularly preferred are co-solvents (E) that are selected from oxygenated solvents. Suitable examples include but are not limited to: (i) the fully and partially reacted alkyl or aryl esters of aromatic, aliphatic or cycloaliphatic polycarboxylic acids; (ii) the fully and partially reacted alkyl or aryl esters of aromatic, aliphatic or cycloaliphatic polyglycols; (iii) the fully and partially reacted alkyl or aryl ethers of aromatic, aliphatic or cycloaliphatic polyglycols, (iv) the neat, the alkyl and aryl substituted cyclic carbonates; (v) the neat, the alkyl and aryl substituted cyclic ethers; (vi) the neat, the alkyl and aryl substituted cyclic esters. By "neat" is meant to designate that the compound is not substituted. Most typical compounds (E) are those selected from (i) the fully and partially reacted alkyl or aryl esters of aromatic, aliphatic or cycloaliphatic polyglycols; (ii) the fully and partially reacted alkyl or aryl ethers of aromatic, aliphatic or cycloaliphatic polyglycols.

Co-solvents that are suitable for use in the present invention include but are not limited to the diethyleneglycol monomethyl ether (DOWANOL®DM), dipropyleneglycol monomethyl ether (DOWANOL®DPM), dimethyl esters or di-isobutyl esters of adipic, glutaric, succinic or phthalic acids and their blends, the ethyl-3-ethoxypropionate (Ektapro®EEP, Eastman), the 2,2,4-trimethyl-1,3-pentanedioldiisobutirate (Kodaflex®TXBI, Eastman), ethylene carbonate and propylene carbonate, propyleneglycol diacetate (DOWANOL®PGDA), dipropylene glycol dimethyl ether (PROGLYDE®DMM), ethyl lactate. Preferably however, no coalescent solvents are present in the aqueous composition (X) of the invention.

Where present, co-solvents (E) typically are present in an amount from 1 to 20 wt %, preferably from 2 to 10 wt %, more preferably from 3 to 6 wt % relative to the total weight of solids in the aqueous composition (X).

It can be advantageous to have at least 2 different types of compounds (A) present in an energy curable aqueous composition (X) of the invention. In a most simple way this can be done by blending two (or more) different compositions (X) of the invention. Alternatively, this can be done by first blending the different compounds (A) followed by a step of emulsification using at least one compound (B) and at least one nonionic emulsifier (D) according to the invention as described above.

Other aqueous materials can be blended with the aqueous composition (X) of the invention. This can be achieved by blending compositions (X) of the invention with one or more other (radiation curable) aqueous compositions, which can be other emulsions but which can also be dispersions. This can however also be achieved by first blending compounds (A) with one or more compounds (F), followed by a step of emulsification using at least one compound (B) and at least one nonionic emulsifier (D) according to the invention as described above.

An advantage of the above approaches is that by using different molecules it is possible to modify or fine-tune the final properties of the coating composition in accordance with the envisaged end application. Below a few practical examples:

Energy curable aqueous compositions (X) of the invention (typically emulsions) can be blended with another energy curable dispersion or emulsion such as for instance UCECOAT® 7849, UCECOAT® 7177, UCECOAT® 7710, UCECOAT® 7571, UCECOAT® 7689, UCECOAT® 7655, UCECOAT® 7699, UCECOAT® 7700, UCECOAT® 7788, UCECOAT® 7733, UCECOAT® 7734, UCECOAT® 7674, UCECOAT® 7200, UCECOAT® 7210, IRR 909. Other polymer dispersions can also be used even if they do not comprise reactive acrylate functions; products falling in this category include polyurethane dispersions (for instance under the name DAOTAN®), acrylic dispersions (for instance under the name VIACRYL®), polyester & alkyd dispersions (for instance under the name RESYDROL®) and polyepoxy dispersions (for instance under the name BECKOPDX®).

Energy curable aqueous compositions (X) of the invention optionally may further comprise at least one photo-initiator (G), which typically is present in an amount from 0.1 to 10 wt %, preferably from 1 to 7 wt %, most preferably from 3 to 5 wt %, relative to the total weight of solids present in the composition. An example of photo-initiator suitable for this invention is ESACURE®HB.

Where desired, compositions (X) of the invention optionally may further comprise at least one functional molecule, oligomer or polymer (H) in an amount from 0.01 to 25 wt %, relative to the total weight of solids present in the composition (X). When present, typically they are present in an amount from 1 to 10 wt %, most preferably from 2.5 to 5 wt %. Compounds (H) are capable to modify the properties of the polymer composition (X), in liquid or solid form, in uncured or cured form and in such a way that it brings an additional performance value to the composition (X). Examples include siliconated and/or fluorinated ethylenically unsaturated compounds such as the products commercialized under the names of IRR 154 and ADDITOL®HGX83 are particularly suitable. Halogenated molecules, and in particular fluorinated molecules, are capable to provide significant surface or interface effect like the adhesion and/or the surface tension. Also suitable are non ethylenically unsaturated siliconated compounds such as Silclean®3700.

Energy curable aqueous compositions (X) of the invention can further include additional ingredients such as catalysts, inhibitors, antioxidants, biocides, fillers, nanoparticles, dyestuffs, pigments inert or functional resins and additives suitable to improve the application of the formulated composition (X) on a substrate and including not limitatively rheology modifiers, anti-settling agents, wetting agents, leveling agents, anti-cratering agents, defoaming agents, slip agents, fire retardant agents, ultraviolet-protection agents, adhesion promoters, etc. Examples of suitable inhibitors include but are not limited to hydroquinone (HQ), methyl hydroquinone (THQ), tert-butyl hydroquinone (TBHQ), di-tert-butyl hydroquinone (DTBHQ), hydroquinone monomethyl ether (MEHQ), 2,6-di-tert-butyl-4-methylphenol (BHT) and the like. They may also include phosphines, like triphenylphosphine (TPP) and tris-nonylphenylphosphite (TNPP), phenothiazine (PTZ), triphenyl antimony (TPS) and any mixtures thereof.

According to a specific preferred embodiment, siccatives may additionally be used as additives, and the coated substrate is concurrently with, or after, the irradiation, subjected to air oxidation to provide air drying.

Energy curable aqueous compositions (X) of the invention optionally may further comprise one or more external thermal crosslinkers that allow dual cure. Examples of suitable crosslinkers are (blocked) polyisocyanates, polyaziridines, polycarbodiimides, polyepoxides, polyalkoxysilanes and metal salts like zirconium ammonium carbonate. Particularly suitable are polyisocyanates, in particular hydrophilic polyisocyanates like BAYHYDUR® 3100.

Energy curable aqueous compositions (X) of the invention can be prepared in various ways yet typically are prepared by blending compounds (A), (B) and (D) and possibly other ingredients (like co-solvents) at a temperature between 20 to 80° C. under high shear using for instance a cowless propeller at 20 to 2000 rpm (depending on the cowless diameter, the vessel diameter and the volume to be stirred). Water is added during a period of time of between 5 and 60 minutes at a temperature of between 15° C. and 80° C. in such an amount to obtain an aqueous composition (X) with a solid content corresponding to the phase inversion, typically near 80%.

Alternatively, the addition of the organic phase containing compounds (A) is made in water. In this case the compound (B) and the nonionic emulsifier (D) of the invention can be added either to the organic phase or to water, or both. Typically, the high shear conditions are maintained for 5 to 60 minutes, after which a second portion of water at a temperature between 15 to 80° C. is added to dilute the composition (X) to the desired solid content. Alternatively, the ingredients can be added to water but a catastrophic phase inversion process is usually preferred. Blending at a shear rate of 10 to 200 rpm typically is continued for a for a period of time between 5 and 30 minutes at a temperature typically of between 15 and 30° C. until a stable emulsion is obtained.

Energy curable aqueous compositions (X) used in the context of the invention typically have a final pH of from 6.5 to 9.5, preferably from 7.0 to 9.0, more preferably from 7.0 to 8.5.

The energy curable aqueous composition (X) according to any embodiment of the present invention is particularly well suited for formulating coatings, overprint varnishes and inks (e.g. inkjet). Both clear and pigmented coatings can be formulated. An aspect of the invention relates to coatings, overprint varnishes and inks (e.g. inkjet) that are prepared from an energy curable aqueous composition (X) of the invention. Inkjet herein can mean both piezo and thermal inkjet. Inkjet inks can be cured with UV (Hg/Ga), UV LED and/or HUV.

A particular aspect of the invention relates to UV LED curable coatings and inks, to HUV curable inks. In particular the invention relates to materials that can be used and fine-tuned for UV LED curable inkjet applications.

The present invention further relates to a process for preparing a coated substrate or article, comprising the step of coating at least part of the substrate or article with the aqueous composition (X) as defined in any embodiment of the present invention. Typically at least part of at least one surface is coated with an energy curable aqueous composition (X) of the invention. Substrates which can be coated with an aqueous composition (X) as defined in any embodiment of the present invention include but are not limited to wood, plastic (e.g. PVC), glass, paper (incl. preprinted or laminated paper), textile, leather, metal, mineral material (stone, rock, brick) and concrete. Other possible materials are resilient floorings like linoleum, vinyl, rubber, cork, rubber ties, bio-based tiles, leather flooring etc. The coating can be a clear or a pigmented coating, a glossy or a matte coating—containing matting agents suitable for use in aqueous compositions. The substrate can already contain a coating. Materials of the invention are suited for further coating and for recoating. Possibly the coating is a site-applied coating.

In the above process, one or more coating layers can be applied. Before curing, water is typically flashed off. Curing can be done via UV or via electron beam curing. UV curing can be done via standard Hg/Ga lamps, though UV LED curing and/or HUV curing are also possible.

The examples which follow illustrate the invention without limiting it.

In the following examples, the acid value is defined, according to DIN EN ISO 3682 (DIN 53 402), as the ratio of that mass mKOH of potassium hydroxide which is needed to neutralise the sample under examination, and the mass mB of this sample, or the mass of the solids in the sample in the case of an aqueous composition; its customary unit is "mg/g".

Also, the hydroxyl number is defined, according to DIN EN ISO 4629 (DIN 53 240), as the ratio of the mass of potassium hydroxide mKOH having the same number of hydroxyl groups as the sample, and the mass mB of that sample (mass of solids in the sample for aqueous compositions); the customary unit is "mg/g".

The solids content was measured by the gravimetric method involving drying the dispersion or solution during 2 h at 120° C.

The dynamic viscosity was measured at 25° C. with a shear rate of 100 s$^{-1}$, using a cone and plate viscometer.

The pH was measured according to DIN EN ISO 10390.

The dynamic light scattering (DLS) was used to characterize the hydrodynamic particle size of the compositions (X). The measurements were conducted at 23° C. using a DelsaNano-c particle analyzer of Beckman-Coulter. The wavelength of the incident monochromatic light was A=658 nm and light scattering was detected in near backscattering at an angle of 165°. The z-average particle size along with the polydispersity index was determined following a second-order cumulant analysis of the electric-field auto-correlation function. The single-particle diffusion coefficient was then estimated from the average decay constant and converted to particle size using Stokes' relationship. Prior to analysis the concentrated compositions were diluted to a particle content of 0.05 w/w % using deionized distilled water and filtered.

The colloidal stability of the aqueous composition (X) was assessed by observing the decantation and/or phase separation on 20 g samples at room temperature and placed in an oven at 60° C. The colloidal stability is reported as the number of days before a sedimentation exceeding 2% of the total height of the sample. A good colloidal stability is obtained when no product deterioration is observed during 10 days at 60° C.

The number-average molecular weight (Mn), the weight-average molecular weight (Mw) and polydispersity (D) were determined by conventional gel permeation chromatography (GPC) with Polystyrene standards EasyCal from Polymer Laboratories (Molecular Weight range: 200-400.000 g/mol). The sample was dissolved (1.0% wt./wt.) in tetrahydrofuran (THF) containing 0.5% toluene as Flow rate marker. Analysis were performed by liquid chromatography (Merck-Hitachi L7100) equipped with 3 PLGel Mixed-D LS polystyrene-divinylbenzene GPC columns (300×7.5 mm×5 µm). The components of the sample were separated by the GPC columns based on their molecular size in solution and detected by a Refractive Index detector. Data were gathered and processed by Polymer Laboratories Cirrus GPC software.

PREPARATION EXAMPLE 1—SYNTHESIS OF AN ALKYD FROM A FATTY ACID PROCESS

In a standard synthetic resin reactor, 62 kg of benzoic acid, 105 kg of coconut oil fatty acid (RADIACID 0600, OLEON), 87 kg of pentaerythritol, and 70 kg of phthalic anhydride were heated to 230° C. Azeotropic distillation at 230° C. using toluene as azeotrope former and subsequent dilution to a mass fraction of solids 80% with toluene yielded 373 kg of an alkyd resin having an acid value of 3.0 mg/g, a dynamic viscosity, diluted with toluene to a mass fraction of solids of 50%, of 45 mPa·s, and a hydroxyl number of 115 mg/g.

EXAMPLE 2 PREPARATION OF ACRYLATED ALKYD (COMPOUND A2)

50 kg of isophone diisocyanate were reacted with 86 kg of di-trimethylolpropane triacrylate and 0.1 kg of bismuth neodecanoate as catalyst and 0.08 kg of butylated hydroxytoluene as stabiliser. The reaction was done at a temperature not exceeding 65° C. and resulted in a product with a specific isocyanate group content of 1.65 meq/g. This product is referred to as M1.

100 kg of an alkyd resin as prepared in example 1 with a mass fraction of solids of 100% having a hydroxyl number of 115 mg/g were mixed with 101.2 kg of glycerol propoxylate tri-acrylate and 0.15 kg of bismuth neodecanoate as catalyst and 0.1 kg of butylated hydroxytoluene and 0.1 kg phenotiazine as stabilisers. This mixture is referred to as M2.

Both components M1 and M2 were added together in a reactor and heated to 85° C. Maturation was done at 85° C. resulting in a specific isocyanate group content of not more than 0.05 meq/g. Post-stabilisation was done with 0.1 kg of butylated hydroxytoluene, 0.34 kg triphenylphosphite and 0.17 kg methoxyhydroquinone resulted in an acrylated alkyd compound (A2) with a dynamic viscosity at 60° C. of 11.8 Pa·s.

EXAMPLE 3: PREPARATION OF COMPOUNDS (B1) TO (B8)

The types and amounts of reagents used to prepare Compounds B1 to B8 are summarized in Table 1.

The fatty acid was charged into a 1000 mL three neck round glass reactor. The reactor was purged with nitrogen and heated to 140° C. The mixture of monomers as mentioned in Table 1, di-t-butyl peroxide (PER) and n-butyl-3-mercaptopropionate (BMP) was continuously added to the reaction mixture over a period of 3 hours at 140° C. under vigorous stirring. The reaction temperature was kept at 140° C. for additional 2 hours until full conversion of the monomers was observed. The system was then cooled to ambient temperature. If the reaction product was solid at ambient temperature it was mechanically crushed to yield solid flakes.

Characteristics of compounds (B1) to (B8) are summarized in Table 1 and are obtained according to the following methods.

In the case of compound (B6), a keto-functionalized product is obtained.

In the case of compound (B8), a solvent is used (Diethylene Glycol Monoethyl Ether Acetate) which is stripped after the reaction.

TABLE 1

| | Composition (g) of compounds B1-B8: | | | | | | | |
|---|---|---|---|---|---|---|---|---|
| | B1 | B2 | B3 | B4 | B5 | B6 | B7 | B8 |
| Soybean oil FA | 33 | 20 | 33 | — | 33 | 33 | — | — |

TABLE 1-continued

Composition (g) of compounds B1-B8:

|  | B1 | B2 | B3 | B4 | B5 | B6 | B7 | B8 |
|---|---|---|---|---|---|---|---|---|
| Linseed oil FA | — | — | — | 33 | — | — | — | — |
| Tall oil FA | — | — | — | — | — | — | 30 | — |
| Styrene | 21.8 | 26 | 43.6 | 43.6 | 21.8 | 33.6 | 46.5 | 32.6 |
| α-Me-Sty | 21.8 | 26 | — | — | — | — | — | 32.6 |
| IBOMA | — | — | — | — | 21.8 | — | — | — |
| DAAM | — | — | — | — | — | 10 | — | — |
| AA | 23.4 | 28 | 23.4 | 23.4 | 23.4 | 23.4 | 23.5 | 34.8 |
| PER | 3.3 | 3.3 | 3.3 | 3.3 | 3.3 | 3.3 | 3.3 | 1.8 |
| BMP | 0.6 | 0.6 | 0.6 | 0.6 | 0.6 | 0.6 | 0.6 | — |
| DGMEA | — | — | — | — | — | — | — | 43.6 |
| Solids [%] | >99 | >99 | >99 | >99 | >99 | >99 | >99 | >99 after stripping of DGMEA |
| AV [mg KOH/g] | 207 | 210 | 240 | 215 | 229 | 270 | 240 | 215 |
| $M_w$ [Da] | 7070 | 6820 | 5410 | 7600 | 6740 | 7200 | 5700 | 5500 |
| Iodic value (g iodine/100 g) | — | — | — | — | — | — | 38 | 0 |

In table 1: FA stands for fatty acid; α-Me-Sty stands for alpha-methyl styrene; IBOMA stands for Isobornyl methacrylate; DAAM stands for Diacetone acrylamide; AA stands for acrylic acid; PER stands for di-t-butyl peroxide; BMP stands for n-Butyl 3-mercapto propionate; DGMEA stands for Diethylene Glycol Monoethyl Ether Acetate, Solids % stands of the Solids content [%]; AV stands for Acid value.

The iodine value measured for compound B7 indicates that roughly 20% of the double bonds originating from the fatty acid have reacted with the acrylic monomers—roughly 80% are still present in the system.

EXAMPLE 4: PREPARATION OF A NEUTRALIZED SOLUTION OF COMPOUND B7

A glass reactor was charged with 173 g de-ionized water and 24.4 g triethylamine (compound (C)). The resulting mixture was heated to 85° C., then 69 g of compound B7 was added to the reaction vessel and the resulting slurry was stirred for two hours at 85° C. A clear, transparent, yellowish solution of 35% solids content was obtained.

EXAMPLE 5: PREPARATION OF A NEUTRALIZED SOLUTION OF COMPOUND B1-136, AND B8

Example 4 was repeated by using each of compounds B1-B6 and B8 instead of compound B7.

EXAMPLE 6: FORMATION OF ENERGY CURABLE AQUEOUS COMPOSITIONS (X) BY EMULSIFICATION OF A COMPOUND (A2) in Presence of a Compound B7

A double-wall stainless steel vessel connected with a heated bath at 60° C. was charged with compound (A2), neutralized solution of B7 and compounds (D). Compounds (A2) and (D) were preheated at 60° C. to facilitate handling. The blend was stirred at a rotation speed of 1000 rpm with a cowless propeller having a diameter of 60 mm until the temperature reached 60° C. The mixture was then stirred at a rotation speed of 1200 rpm while first part W1 of water at 60° C. was added at a constant flow rate during about 5 minutes using a peristaltic pump. A phase inversion point corresponding to a maximum of the viscosity was observed and the mixture was further sheared at a rotation speed of 1500 rpm for an additional period of 15 min at a constant temperature of 60° C. An additional quantity of water W2 at room temperature was then added to the mixture at a constant flow rate during about 5 minutes using a peristaltic pump, while the cowless rotation speed was progressively decreased to 200 rpm and the temperature decreased to room temperature.

Characteristics of aqueous compositions X1R, X5R and X2 to X4 are summarized in table 2.

TABLE 2

|  | X1R | X2 | X3 | X4 | X5R |
|---|---|---|---|---|---|
| Compound (A2) (g) | 92 | 92 | 92 | 92 | 92 |
| Solution of compound B7 (g) | 0 | 5.7 | 11.4 | 17.1 | 22.9 |
| Maxemul ®7101 (g) | 4 | 3 | 2 | 1 | 0 |
| Hydropalat ® WE 3162 (g) | 4 | 3 | 2 | 1 | 0 |
| Water W1/W2 (g) | 14/86 | 23/71 | 28/60 | 31/52 | 39/37 |
| Final Properties |  |  |  |  |  |
| Solid Content (wt %) | 50.0 | 50.1 | 50.1 | 50.0 | 50.3 |
| Particle diameter (nm) | 435 | 160 | 288 | 292 | 400 |
| Viscosity (25° C., mPas) | 21 | 47 | 42 | 154 | 190 |
| pH | 3.1 | 7.8 | 8.1 | 8.1 | 8.1 |
| 24 h stability at RT | pass | pass | pass | pass | pass |
| Stability at 60° C. (days) | >10 | >10 | >10 | >10 | <3 |

In Table 2, Maxemul®7101 (Croda) is a proprietary di-block copolymer essentially consisting of a polyethylene oxide having in average 63 repeat units and a polypropylene oxide moiety having in average 47 repeat unit, having an HLB ~11.5 and a Mw of 5500 g/mol; Hydropalat® WE 3162 (BASF) is a proprietary nonionic tri-bloc emulsifier basically consisting of a polyethylene oxide, a polypropylene oxide and a polyethylene oxide moiety and having an HLB of about 4. X1R and X5R are comparative examples.

As can be seen in Table 2, the final particle diameter and the viscosity obtained by the embodiments of the present invention (X2, X3 and X4) are both smaller than the final particle diameter and the viscosity obtained with the comparative examples (X1R and X5R). Furthermore, the pH of the compositions (X) according to an embodiment of the present invention is closer to neutrality compared to the pH of comparative example X1R (lacking compounds B). This is advantageous because it makes formulation based on these compositions (X) easier to form. Yet another advantage of the composition (X) of the present invention is their very good stability both at room temperature (RT) and at 60° C. when compared to comparative example X5R (lacking compounds D).

EXAMPLE 7: FORMATION OF ENERGY CURABLE AQUEOUS COMPOSITIONS (X) BY EMULSIFICATION OF A COMPOUND (A2) in Presence of a Compound B8

Example 6 was repeated by substituting B8 for B7.
Characteristics of aqueous compositions X6 and X7 are summarized in table 3.

TABLE 3

|  | X6 | X7 |
|---|---|---|
| Compound A2 (g) | 92 | 92 |
| Solution of compound B8 (g) | 5.7 | 11.4 |
| Maxemul ®7101 (g) | 3 | 2 |
| Hydropalat ® WE 3162 (g) | 3 | 2 |
| Water W1/W2 (g) | 51/46 | 57/40 |
| Final properties |  |  |
| Solid Content (wt %) | 50.3 | 50.2 |
| Particle diameter (nm) | 153 | 84 |
| Viscosity (25° C., mPas) | 17 | 14 |
| pH | 7.6 | 7.8 |
| 24 h stability at RT | pass | pass |
| Stability at 60° C. (days) | <1 | <1 |

As can be seen in table 3, the final particle diameter and the viscosity obtained by the embodiments of the present invention (X6 and X7) are both smaller than the final particle diameter and the viscosity obtained with the comparative examples (X1R and X5R). The smaller particle diameter is advantageous amongst other things because small particles are usually more stable. Furthermore, the pH of the compositions according to an embodiment of the present invention is closer to neutrality compared to the pH of comparative example X1R. This is advantageous because it makes formulation based on these compositions easier to form from commercial additive which are typically not compatible with an acidic medium. Also advantageous is the high solid content compared to traditional UV curable polyurethane dispersions. From the comparison of this table with table 2, it also transpires that the presence of fatty acid in the composition of the (copolymers B1-7 appears to increase the stability at room temperature of the resulting composition (X) X1R, X2, X3, X4 and X5R.

EXAMPLE 8: FORMATION OF ENERGY CURABLE AQUEOUS COMPOSITIONS (X) BY EMULSIFICATION OF A COMPOUND (A1) in Presence of a Compound B7

Example 6 was repeated by substituting A1 for A2 and B8 for B7.
Characteristics of aqueous compositions X8R, X12R and X9 to X11 are summarized in table 4.

TABLE 4

|  | X8R | X9 | X10 | X11 | X12R |
|---|---|---|---|---|---|
| Compound A1 (g) | 92 | 92 | 92 | 92 | 92 |
| Solution of compound B7 (g) | 0 | 5.7 | 11.4 | 17.1 | 22.9 |
| Maxemul ®7101 (g) | 8 | 6 | 4 | 2 | 0 |
| Hydropalat ® WE 3162 (g) | 0 | 0 | 0 | 0 | 0 |
| Water W1/W2 (g) | 20/40 | 23/36 | 37/22 | 27/45 | 47/12 |
| Final properties |  |  |  |  |  |
| Solid Content (wt %) | 62.5 | 62.9 | 62.9 | 58.1 | 62.9 |
| Particle diameter (nm) | 405 | 123 | 115 | 195 | 154 |
| Viscosity (25° C., mPas) | 127 | 246 | 535 | 732 | 465 |
| pH | 3.6 | 7.0 | 7.1 | 7.4 | 7.5 |
| 24 h stability at RT | pass | pass | pass | pass | pass |
| Stability at 60° C. (days) | >10 | >10 | >10 | <5 | <1 |

Compound A1 used in table 4 is a hexafunctional aliphatic urethane acrylate oligomer.

As can be seen in table 4, the final particle diameter obtained by the embodiments of the present invention (X9, X10 and X11) is relatively low compared to the comparative example X8R and similar to the particle diameter of comparative example X12R. The viscosity of the embodiments of the present invention (X9, X10 and X11) was not systematically higher or lower than the viscosity of the comparative examples X8R and X12R. Similarly to what was observed in tables 2 and 3, the pH of the compositions (X) according to an embodiment of the present invention is closer to neutrality compared to the pH of comparative example X8R (no compounds B). As was observed for the examples of tables 2 and 3, embodiments of the present invention show a much improved stability both at room temperature (RT) and at 60° C. when compared to a comparative example (X12R—no compounds D).

As can be seen by comparing tables 2, 3, and 4, when compound (B) is prepared by radical polymerization of monomers comprising at least one unsaturated fatty acid (X2, X3, X4, X9, X10, X11), stability is improved compared to when compound (B) is not prepared from at least one unsaturated fatty acid (X6; X7).

EXAMPLE 9: FORMATION OF ENERGY CURABLE AQUEOUS COMPOSITIONS (X) BY EMULSIFICATION OF A COMPOUND (A) in Presence of a Compound B1-B6

Example 6, 7 and 8 are repeated by substituting each of B1-B6 for B7 or B8.

EXAMPLE 10: FORMULATIONS BASED ON ENERGY CURABLE AQUEOUS COMPOSITIONS (X) OBTAINED IN EXAMPLES 6-8

The emulsions which are not passing aging test have not been formulated and applied for performance testing.

To the compositions of the examples, a photo-initiator blend (1.5% of the mass of binder solids in the emulsion of a mixture of equal masses of benzophenone and CPK (1-hydroxy-cyclohexyl-phenyl ketone) and 0.5% of the mass of binder solids in the emulsion of IRGACURE® DW 819 (a 45% strength dispersion of bis-acyl phosphine oxide in water, BASF Specialty Chemicals). The viscosity of the formulated composition was adjusted to between 500 mPa·s and 1000 mPa·s by adding a quantity of a mixture of equal mass of a polyurethane thickener (TAFIGEL PUR 50, MÜNZING Chemie GmbH) with water. The formulated composition was applied with a bar coater of 20 μm on Leneta™ Plain White Chart: WA, E #4402 and dried in the oven at 50° C. for five minutes.

The radiation curing was effected by exposing the coated and dried charts to a mercury ultra-violet lamp with a power of 120 W/cm at two times 10 m/min. The charts were evaluated for film aspect, gloss, reactivity, scratch resistance and stain resistance.

The following characteristics where evaluated as follow:
Film aspect before/after curing: all films show nice, clear aspect without defects, before and after the oven and after UV curing.
Gloss level: The evaluation of the gloss level was carried out on the film, formed on Leneta™ Plain White Chart: WA, E #4402 as described above. The values listed in Table 6 are given in gloss units [GU] for an angle of 20 and 60° according to DIN EN ISO 2813.
Reactivity (Curing): a film is considered fully cured when it resists to 100 acetone double rubs (ADR), meaning there is no break through the coating. The assessment with acetone double rubs (ADR) is done by pressing a cotton rag saturated with acetone with a backward and forward motion on the coated surface; one double rub is equal to a backward and forward stroke on the coated surface.
Scratch resistance was evaluated the aspect of a film on a polycarbonate substrate after 10 double rubs from a steel wool pad. The results are rated visually and recorded in a 1-5 scale: 5=very good; 1=very bad.
Stain resistance (on Leneta™ Plain White Chart: WA, E #4402): a stain is made with any of the following staining product: ethanol 10%, ammonia 10%, isobetadiane, eosine 2%, mustard, coffee 4% or methylene blue and washed after 1 h (for methylene blue) or 16 h (for all other staining products) at ambient temperature using a tissue saturated with isopropanol. The results are rated visually and recorded in a 1-5 scale: 5=no stain; 4=very light stain; 3=moderate stain; 2=strong stain; 1=very strong stain. A high value (5) is expected to provide the best protection against any degradation of the coated object.

As can be seen in table 5, films obtained from formulations comprising acrylated alkyd-based compositions (X) according to an embodiment of the present invention (F2, F3, and F4) show an aspect, scratch resistance, and stain resistance comparable to those observed for films obtained from a formulation comprising the comparative composition F1R. Similarly, films obtained from formulations comprising urethane acrylate-based compositions according to an embodiment of the present invention (F9, F10, and F11) show an aspect, scratch resistance, and stain resistance comparable to those observed for films obtained from a formulation comprising the comparative composition F8R.

The invention claimed is:

1. An energy curable aqueous composition (X) comprising:
    water;
    at least one water-insoluble ethylenically unsaturated compound (A);
    at least one compound (B) comprising at least one (meth) acrylic polymer (B1) containing ionic functional groups that are at least partly neutralized by a neutralizing agent (C) and/or
    at least one (meth)acrylic hybrid (B2) containing ionic functional groups that are
    at least partly neutralized by a neutralizing agent (C); and
    at least one nonionic emulsifier (D) comprising alternating polyalkylene oxide segments, said at least one nonionic emulsifier (D) having an HLB value of at least 4.5 as determined via $^1$H-COSY NMR,
    wherein each (meth)acrylic hybrid of the at least one (meth)acrylic hybrid (B2) is a polymer that is prepared from (1) one or more (meth)acrylic monomers and (2) one or more other ethylenically unsaturated monomers and/or one or more unsaturated fatty acids, and
    wherein the energy curable aqueous composition (X) has a pH as measured according to DIN EN ISO 10390 of from 6.5 to 9.5.

2. The energy curable aqueous composition (X) according to claim 1, having a solid content of from 30 to 70 wt %.

3. The energy curable aqueous composition (X) according to claim 1, wherein the at least one water-insoluble ethylenically unsaturated compound (A) is at least one member selected from the group consisting of: urethane (meth)

TABLE 5

| | Formulation | | | | | | | |
|---|---|---|---|---|---|---|---|---|
| | F1R X1R | F2 X2 | F3 X3 | F4 X4 | F8R X8R | F9 X9 | F10 X10 | F11 X11 |
| Additol BCPK | 1.5 | 1.5 | 1.5 | 1.5 | 1.5 | 1.5 | 1.5 | 1.5 |
| Tafigel PUR50/50 | 2.3 | 0 | 2.2 | 2.2 | 2.5 | 1.8 | 0 | 3.0 |
| Film aspect | | | | | | | | |
| Gloss (20°) | 83 | 82 | 76 | 76 | 87 | 86 | 86 | 14 |
| Gloss (60°) | 92 | 92 | 92 | 92 | 94 | 95 | 95 | 62 |
| Reactivity (ADR) | >100 | >100 | >100 | 100 | >100 | >100 | >100 | >100 |
| Scratch Resistance | 1 | 2 | 2 | 1 | 5 | 5 | 5 | 5 |
| Stain Resistance | | | | | | | | |
| EtOH 10% - 16 h | 5 | 5 | 5 | 5 | 5 | 5 | 5 | 5 |
| NH$^3$ 10% - 16 h | 5 | 5 | 5 | 5 | 5 | 5 | 5 | 5 |
| Isobetadine - 16 h | 1 | 2 | 1 | 2 | 4 | 4 | 5 | 3 |
| Eosine 2% - 16 h | 1 | 1 | 1 | 1 | 5 | 5 | 5 | 3 |
| Mustard - 16 h | 1 | 1 | 1 | 1 | 5 | 5 | 5 | 5 |
| Coffee 4% - 16 h | 3 | 3 | 4 | 4 | 5 | 5 | 5 | 5 |
| Methylene blue 1% - 1 h | 2 | 1 | 1 | 2 | 4 | 3 | 4 | 3 |
| average | 2.6 | 2.6 | 2.6 | 2.9 | 4.7 | 4.6 | 4.8 | 4.1 | acrylates (A1), polyester (meth)acrylates (A2) and poly(meth)acrylic (meth)acrylates (A6).

4. The energy curable aqueous composition (X) according to claim 1, comprising from 80 to 98 wt % of the at least one water-insoluble ethylenically unsaturated compound (A) based on the sum of (A), (B) and (D) on a dry weight basis.

5. The energy curable aqueous composition (X) according to claim 1, wherein the ionic functional groups of the at least one compound (B) are acidic functional groups.

6. The energy curable aqueous composition (X) according to claim 1, wherein the at least one compound (B) has an acid value when contacted with water of at least 140 mg KOH/g as determined according to DIN EN ISO 2114.

7. The energy curable aqueous composition (X) according to claim 1, wherein the at least one compound (B) is obtained by a process comprising the steps of:
  (a) preparing at least one polymer by radical polymerization of monomers comprising:
    (b1) optionally, at least one unsaturated fatty acid,
    (b2) at least one ethylenically unsaturated monomer containing at least one ionic functional group or a group capable of forming an ionic functional group when contacted with water, and
    (b3) at least one ethylenically unsaturated monomer different from (b1) and (b2),
    wherein at least one of the ethylenically unsaturated monomers (b2) and/or at least one of the ethylenically unsaturated monomers (b3) are (meth)acrylic monomers, and
  (b) neutralizing totally or partially the ionic groups of the at least one polymer of step (a) and dissolving it in water to form the at least one compound (B), wherein the at least one compound (B) contains neutralized ionic functional groups.

8. The energy curable aqueous composition (X) according to claim 6, wherein the at least one compound (B) is obtained from:
  0 to 50 wt % of at least one unsaturated fatty acid (b1),
  5 to 90 wt % of at least one ethylenically unsaturated monomer (b2),
  5 to 80 wt % of at least one ethylenically unsaturated monomer (b3), based on the sum of (b1), (b2) and (b3) on a dry weight basis,
wherein at least one of the ethylenically unsaturated monomers (b2) and/or at least one of the ethylenically unsaturated monomers (b3) are (meth)acrylic monomers.

9. The energy curable aqueous composition (X) according to claim 1, wherein the at least one compound (B) has a weight average molecular weight (Mw) of from 3000 to 10000 Dalton as determined according to DIN 55672-1.

10. The energy curable aqueous composition (X) according to claim 1 comprising:
  from 12 wt % to 88 wt % of the at least one compound (B), and
  from 88 wt % to 12 wt % of the at least one emulsifier (D), based on the sum of (B) and (D) on a dry weight basis.

11. The energy curable aqueous composition (X) according to claim 1, having a pH as measured according to DIN EN ISO 10390 of from 7.0 to 9.0.

12. The energy curable aqueous composition (X) according to claim 1, wherein the at least one compound (B) comprises at least one fatty-acid monomeric unit in its backbone.

13. The energy curable aqueous composition (X) according to claim 1, wherein the at least one nonionic emulsifier (D) comprises alternating polyethylene oxide and polypropylene oxide segments, and optionally bears one or more groups selected from the group consisting of alkyl groups, aryl groups, hydroxyl groups and copolymerizable ethylenically unsaturated groups.

14. The energy curable aqueous composition (X) according to claim 1, wherein the at least one nonionic emulsifier (D) comprises terminal ethylenically unsaturated groups.

15. The energy curable aqueous composition (X) according to claim 1, wherein the at least one nonionic emulsifier (D) comprises no ethylenically unsaturated groups.

16. The energy curable aqueous composition (X) according to claim 1, wherein the at least one nonionic emulsifier (D) has an HLB value of at most 19 as determined via $^1$H-COSY NMR.

17. A process for preparing a coated substrate or article, comprising the step of coating at least part of the substrate or article with the aqueous composition (X) according to claim 1.

18. The energy curable aqueous composition (X) according to claim 1, having a solid content of from 40 to 65 wt %.

19. The energy curable aqueous composition (X) according to claim 12, wherein the at least one compound (B) contains no (meth)acrylate groups.

20. The energy curable aqueous composition (X) according to claim 14, wherein the terminal ethylenically unsaturated groups are (meth)acryloyl groups.

\* \* \* \* \*